April 6, 1926.  W. S. GUBELMANN  1,579,929
DISTINGUISHING MEANS FOR KEYS AND DIALS OF REGISTERING MACHINES
Original Filed Jan. 10, 1900   9 Sheets-Sheet 1
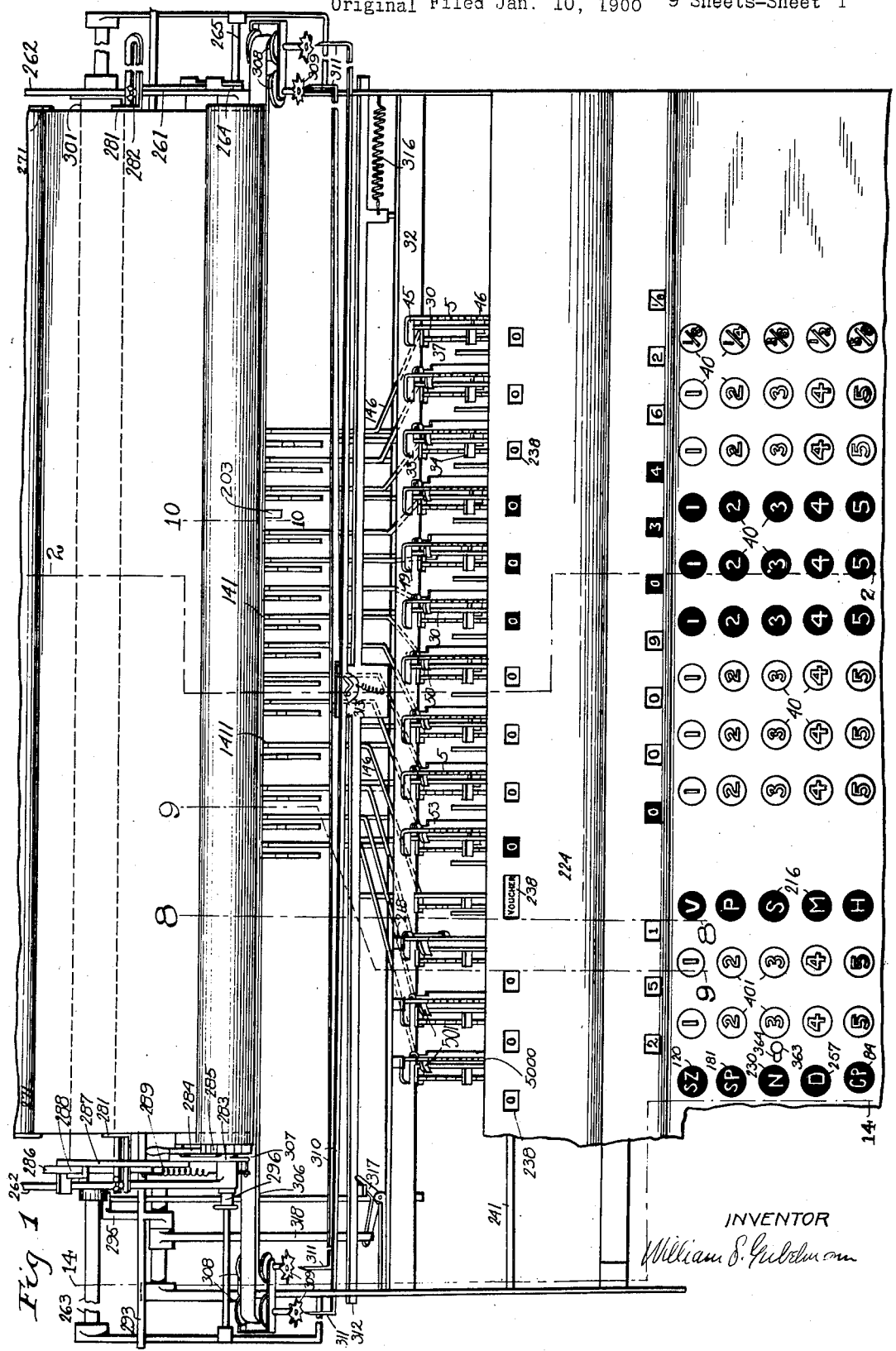
INVENTOR
William S. Gubelmann April 6, 1926. 1,579,929
W. S. GUBELMANN
DISTINGUISHING MEANS FOR KEYS AND DIALS OF REGISTERING MACHINES
Original Filed Jan. 10, 1900  9 Sheets-Sheet 2
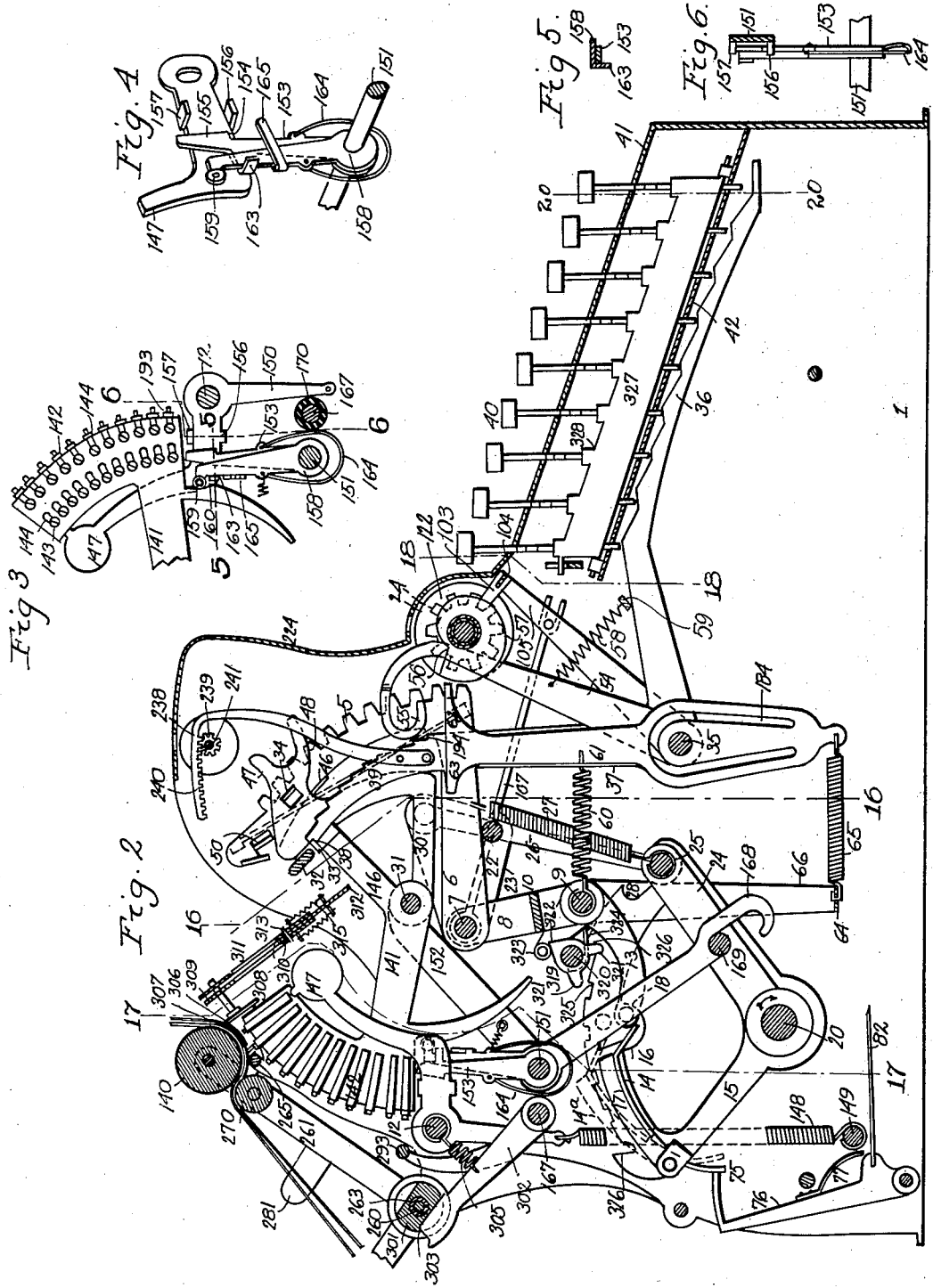
INVENTOR
William S. Gubelman

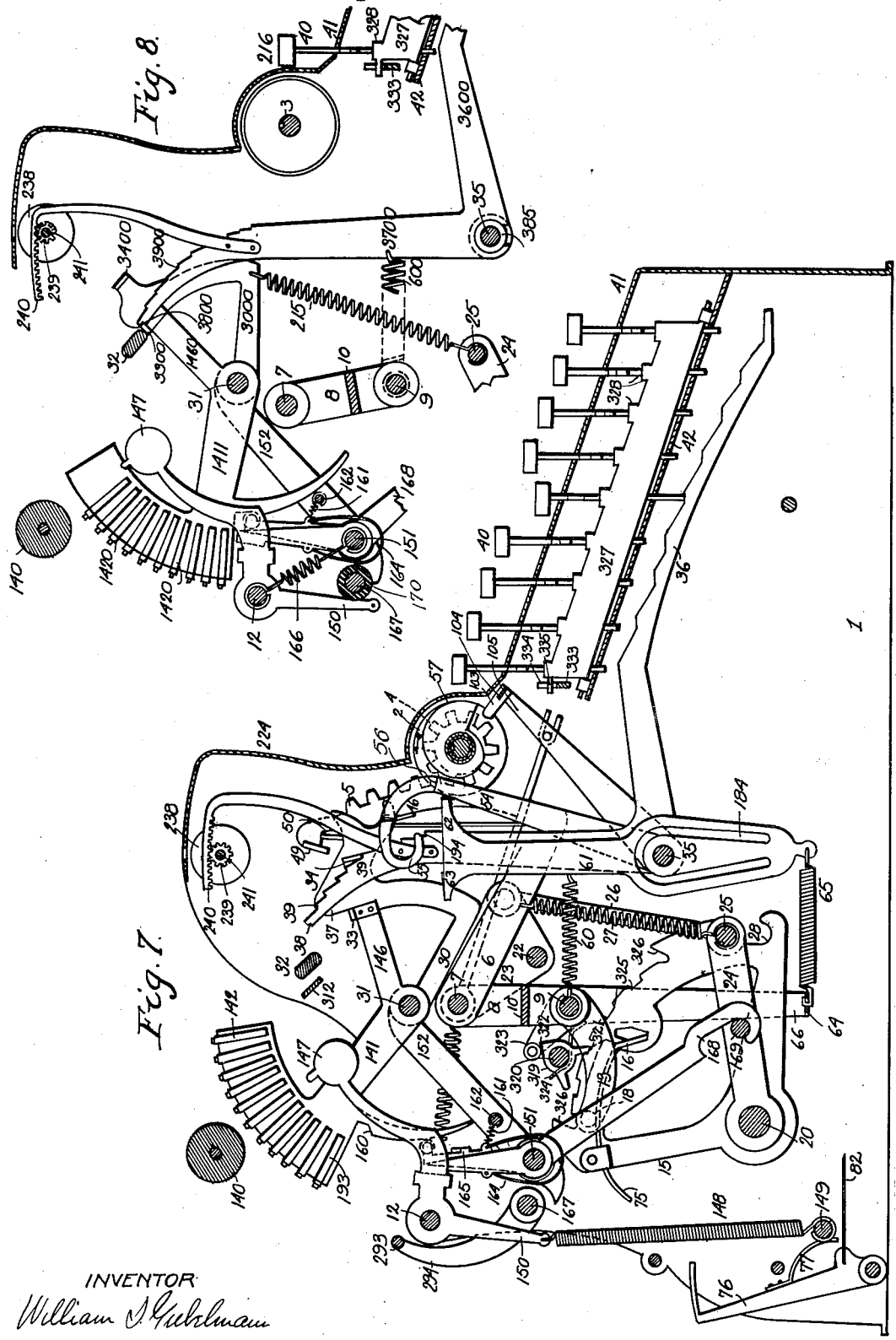

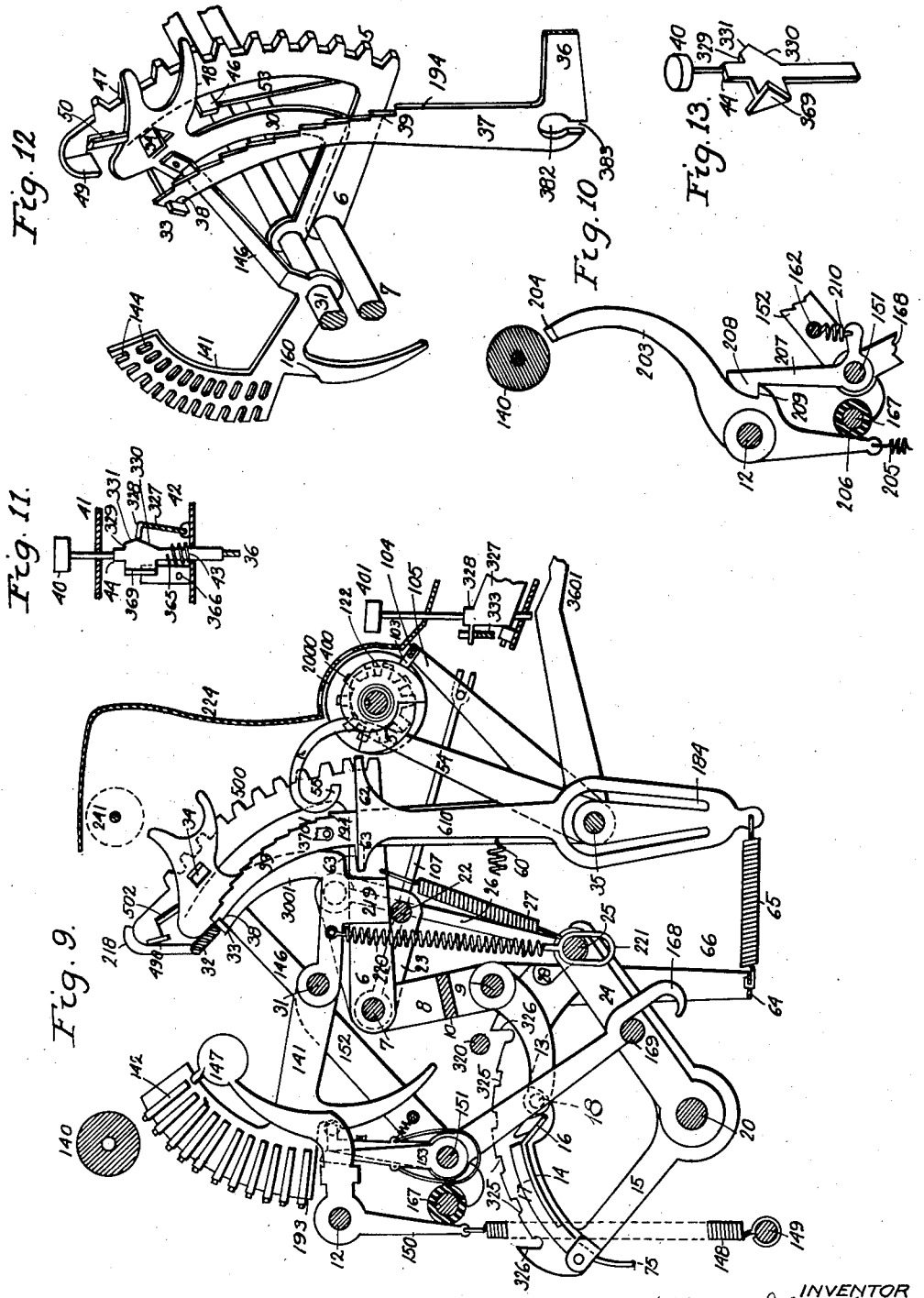

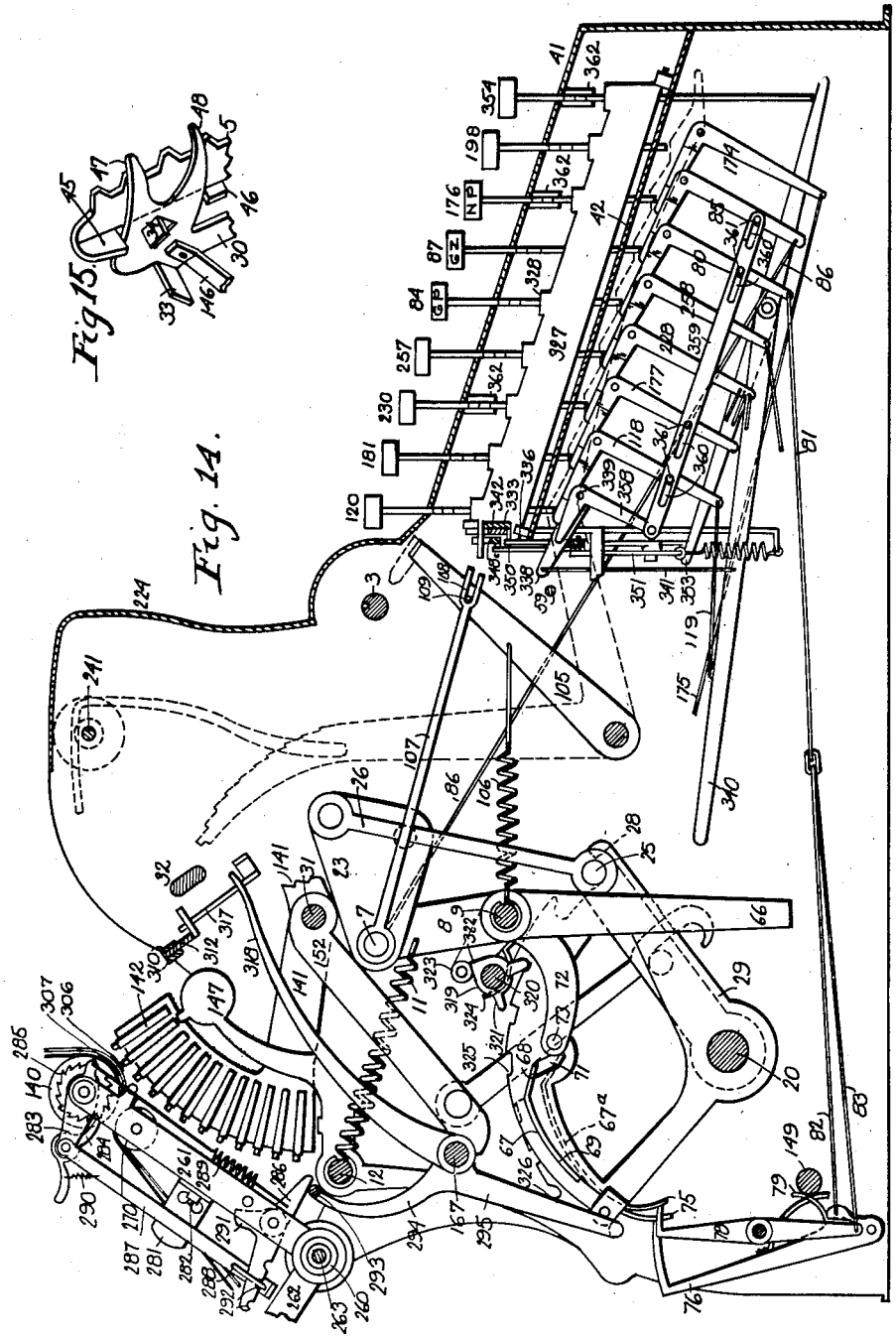

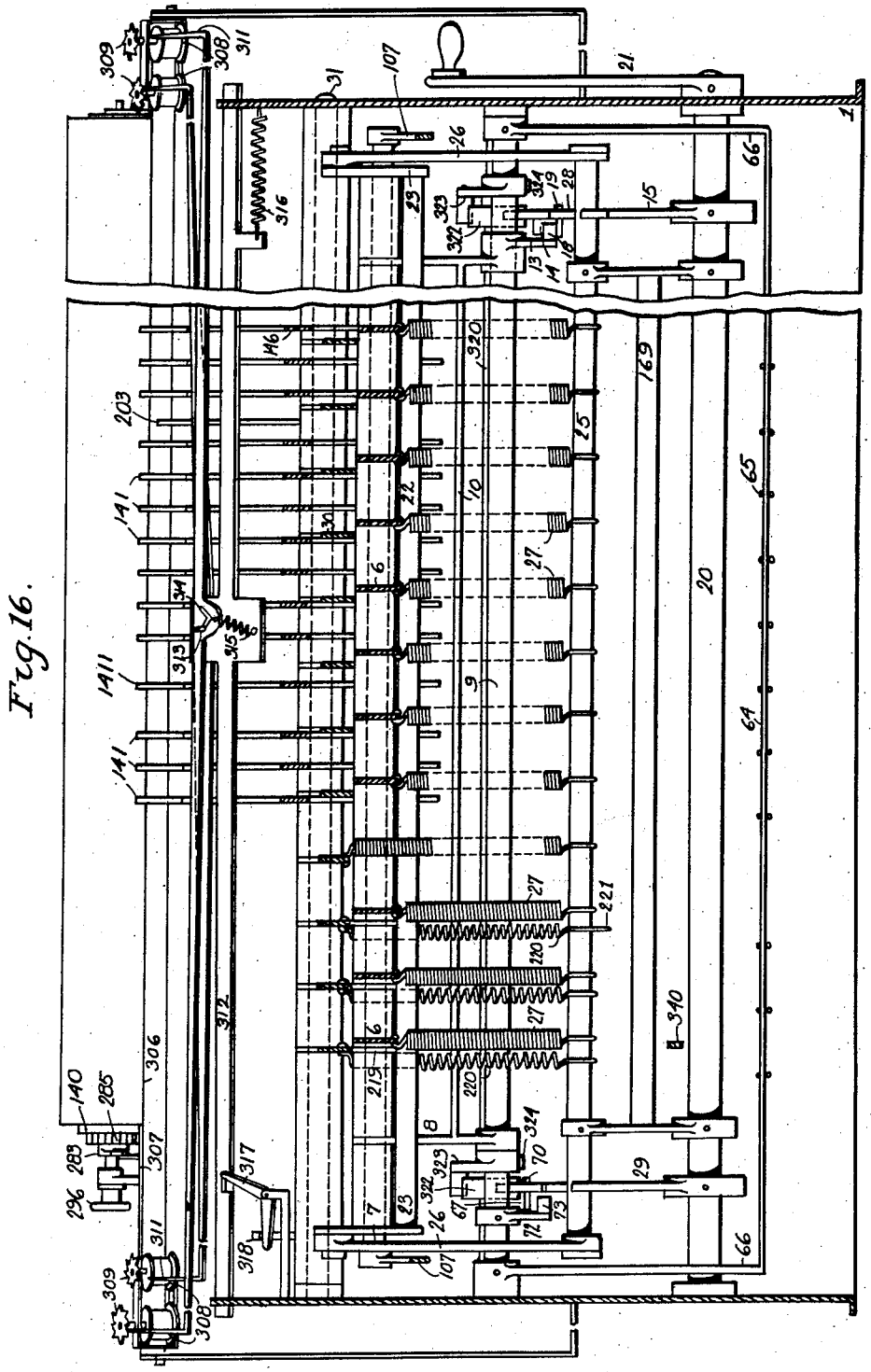

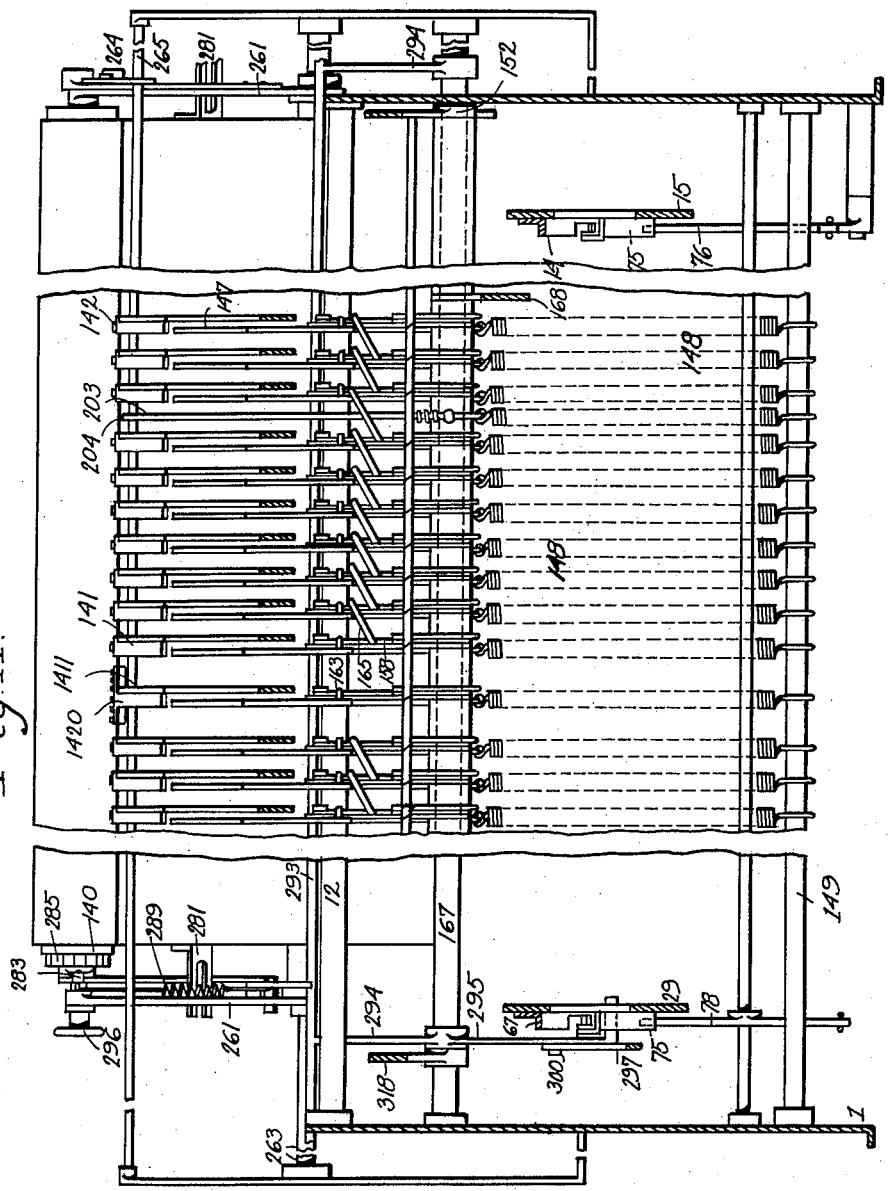

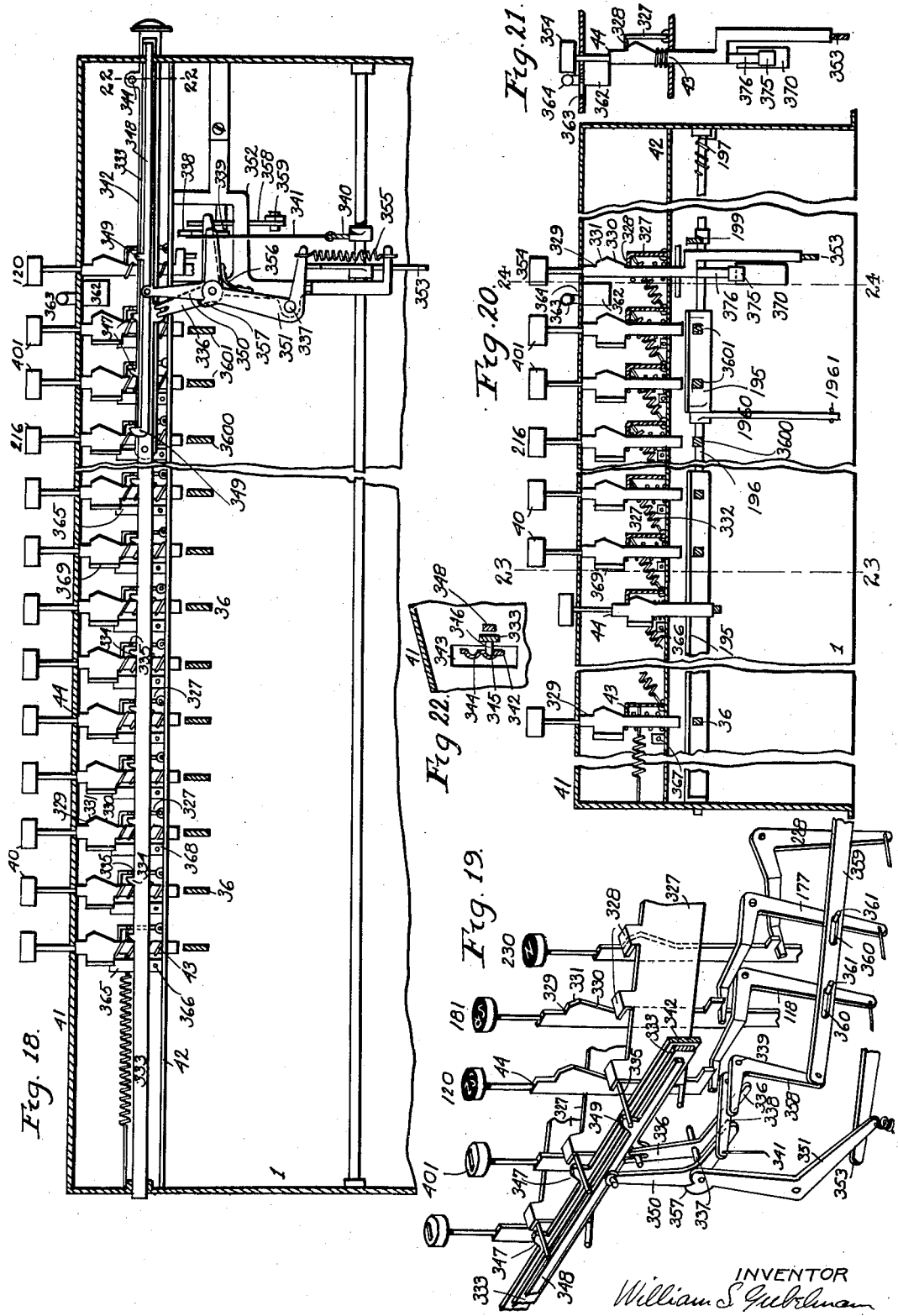

April 6, 1926.
W. S. GUBELMANN
1,579,929
DISTINGUISHING MEANS FOR KEYS AND DIALS OF REGISTERING MACHINES
Original Filed Jan. 10, 1900   9 Sheets-Sheet 9
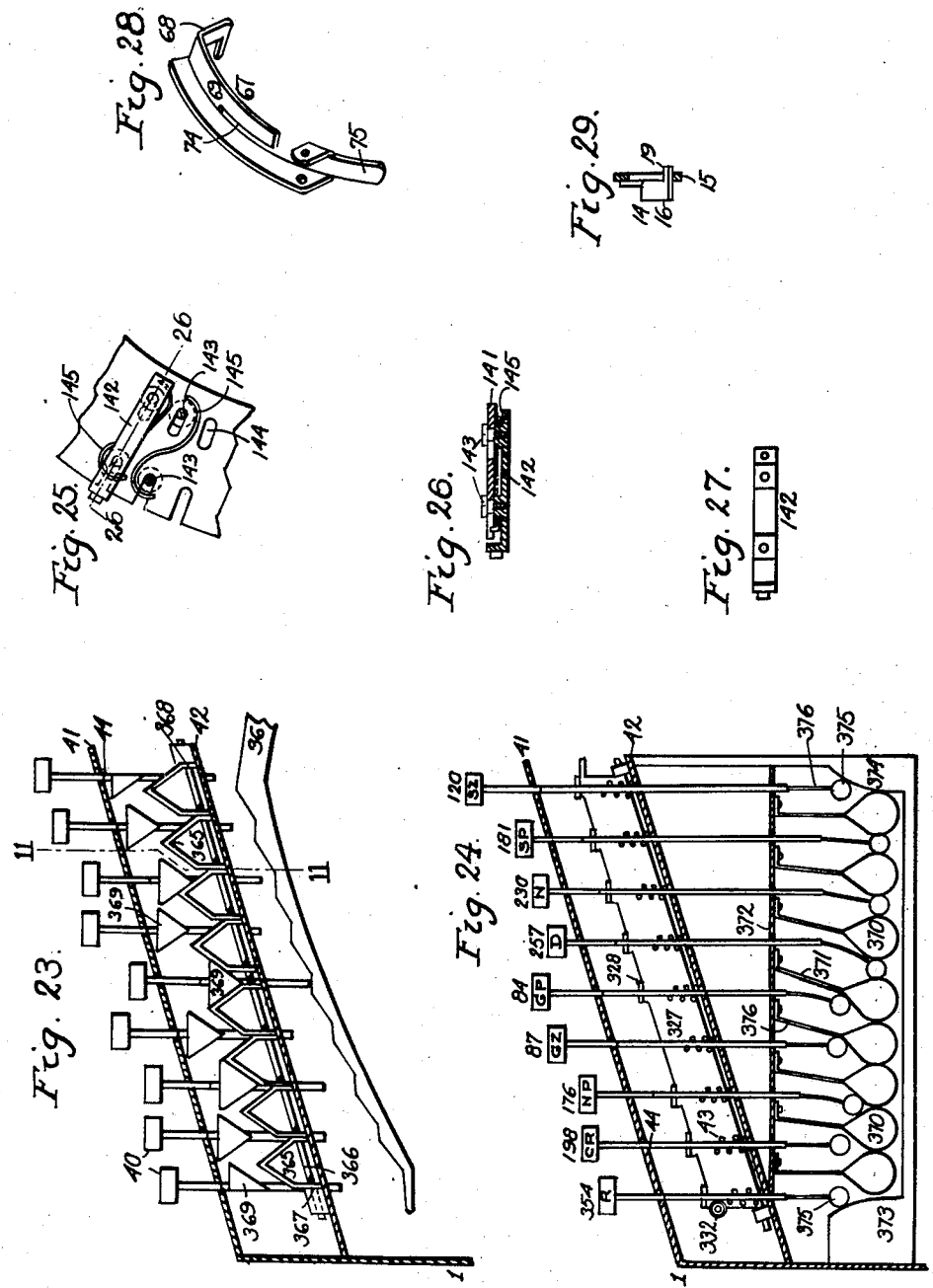

Patented Apr. 6, 1926.

1,579,929

UNITED STATES PATENT OFFICE.

WILLIAM S. GUBELMANN, OF BUFFALO, NEW YORK.

DISTINGUISHING MEANS FOR KEYS AND DIALS OF REGISTERING MACHINES.

Original application filed January 10, 1900, Serial No. 1,004. Divided and this application filed November 9, 1918. Serial No. 261,806.

*To all whom it may concern:*

Be it known that I, WILLIAM S. GUBELMANN, a citizen of the United States, residing in Buffalo, in the county of Erie and State of New York, have invented certain new and useful Improvements in Distinguishing Means for Keys and Dials of Registering Machines, of which the following is a specification.

The present invention relates to distinguishing means for keys and dials of registering mechanisms and is a division of my pending application, Serial No. 1,004, filed January 10, 1900, now Patent No. 1,492,201, granted September 12, 1922.

One of the objects of the invention is to provide a plurality of keys, dials and indicators, such that their inherent characteristics will indicate the denominations which they represent.

Another object is to provide such devices so colored as to indicate the denominations of items to be printed by a printing mechanism associated with said devices.

Another object is to provide a "split" machine in which the keys, dials and indicators may be distinguished by their color or inherent characteristics.

Another object is to provide word and number printing controlling keys which are distinguished by color for indicating which keys are to be operated for producing the desired printed record.

Another object is to produce a keyboard comprising number and function controlling keys which are distinguished from each other by coloring.

Another object is to so color keys, dials and indicators that the keys are readily associated with the respective dials and indicators.

Other objects will be disclosed by the following description and pointed out in the appended claims.

The mechanism for accomplishing all of the above objects is illustrated in the accompanying drawings consisting of nine sheets, in which:

Figure 1 is a fragmentary top plan view of my improved adding and recording mechanism, and distinctly displaying the coloring of the keys, dials and indicators.

Figure 2 is a vertical longitudinal section of the same, taken substantially in line 2—2, Figure 1, and showing the adding and recording mechanism of one column or set of keys in the normal or inoperative position.

Figure 3 is a fragmentary sectional elevation of the printing mechanism of one of the rows of keys viewed from the side opposite to that shown in Figure 2.

Figure 4 is a fragmentary perspective view of the hammer-operating mechanism.

Figure 5 is a horizontal section in line 5—5, Figure 3.

Figure 6 is a vertical section in line 6—6, Figure 3.

Figure 7 is a view similar to Figure 2, but showing the parts of the adding and recording mechanism in shifted position.

Figure 8 is a fragmentary longitudinal sectional elevation taken substantially in line 8—8, Figure 1, and showing the mechanism whereby words are printed.

Figure 9 is a fragmentary longitudinal sectional elevation taken substantially in line 9—9, Figure 1, and showing principally the auxiliary adding and recording mechanism.

Figure 10 is a fragmentary longitudinal sectional elevation taken substantially in line 10—10, Figure 1, and showing the preferred means for producing vertical ruling on the sheet which receives the record.

Figure 11 is a sectional view taken in line 11—11, Figure 23.

Figure 12 is a fragmentary perspective view showing the key lever, the main gear segment, the controlling arm and the printing segment of one of the higher columns of numbers.

Figure 13 is a perspective view of one of the registering keys.

Figure 14 is a longitudinal sectional elevation, taken substantially in line 14—14, Figure 1, and showing particularly the mechanism whereby different parts of the machine may be thrown into and out of gear.

Figure 15 is a fragmentary perspective view of the units controlling arm and gear segment.

Figure 16 is a transverse section taken in line 16—16, Figure 2.

Figure 17 is a vertical transverse section taken in line 17—17, Figure 2.

Figure 18 is a fragmentary transverse sectional elevation taken in line 18—18, Figure 2, and showing the mechanism for holding the keys in their depressed position and for releasing the same.

Figure 19 is a fragmentary perspective view of the key holding and releasing mechanism.

Figure 20 is a fragmentary transverse sectional elevation, taken in line 20—20, Figure 2.

Figure 21 is a similar view showing one of the keys locked in a depressed position.

Figure 22 is a fragmentary vertical section in line 22—22, Figure 18.

Figure 23 is a fragmentary longitudinal sectional elevation, taken in line 23—23, Figure 20, and showing the mechanism whereby only one key can be in a depressed position at a time.

Figure 24 is a fragmentary longitudinal sectional elevation, taken in line 24—24, Figure 20, and showing the mechanism whereby only a predetermined number of keys may be in a depressed position at any one time.

Figure 25 is a fragmentary sectional side elevation of one of the printing segments showing the means for mounting the type movably thereon.

Figure 26 is a cross section of the type segment taken in line 26—26, Figure 25.

Figure 27 is a side view of one of the type carriers viewed from the side opposite to that shown in Figure 25.

Figure 28 is a perspective view, showing one of the pair of substantially similar cams, one of which serves to shift the main dial operating segments into their operative position, and the other one of which serves to shift the parts into position for printing a total of the added numbers.

Figure 29 is a vertical section in line 29—29, Figure 7.

Like reference characters refer to like parts in the several figures.

General construction.

1, represents the main frame of the machine which may be of any available construction so as to support the working parts of the machine.

2, Figures 2 and 7, represents a number of main dials which register the total of the numbers which are added together. These dials consist preferably of cup-shaped wheels which are numbered on their peripheries and are mounted in their proper order on a transverse dial shaft 3, which is journaled in bearings on the main frame, the dials being so arranged that the dial representing the lowest number is arranged on the right hand end of the series and the dials representing the successively higher numbers being arranged successively in their order toward the left from the dial representing the lowest number. The lowest or right hand dial is preferably divided on its periphery into eighths, so as to indicate fractions of a cent in eighths, and the remaining dials are graduated on their peripheries according to the decimal system, into tenths. As shown in the drawings, ten total dials are shown and extend from fractions of a cent to tens of millions, but, if desired, additional dials may be added to the right, and to the left of the series, if it is desired to register smaller divisions of a cent or more than tens of millions. Each of the main dials 2 is provided on its left-hand side with a gear pinion 4, which is rigidly connected therewith, as shown in Figures 2, 7 and 9. The pinion of the fraction wheel has eight teeth while the pinions of the remaining dials are each provided with ten teeth. 5 represents the main registering gear segments, one of which is provided for each of the dials 2 and is adapted to engage with the pinion thereof, for operating the respective dial. Each of these gear segments is arranged in rear of its companion gear pinion and is provided at its lower end with a rearwardly projecting arm 6 which is pivoted loosely on a transverse supporting rod 7. This rod is mounted with its end on the upper ends of two rock arms 8 which turn loosely with their lower ends on a transverse rock shaft 9. The rock-arms 8 are connected by a transverse bar 10 which compels the two arms to move back and forth together. In the normal position of the gear segments when the machine is at rest these segments are retracted rearwardly out of engagement with the dial pinions of the dials and the segments are elevated so that their lowermost teeth are opposite the spaces between the adjacent teeth of the dial pinions, these spaces being in line with the pivots of the pinions and the gear segments.

The gear segments are yieldingly held backwardly out of engagement with the dial pinions by means of springs 11, connecting the rock-arms 8 with a stationary part of the frame.

Figure 14 shows one of the springs 11 connecting one of the rock-arms 8 with a transverse stationary bar 12 in the rear part of the machine. The gear segments are moved forwardly so that their teeth engage with the dial pinions 4, by means of a shifting rock-arm 13 (Fig. 9), which is preferably secured to the right-hand rock-arm 8 and projects rearwardly. Upon raising the shifting rock-arm 13, the rock-arms 8 are swung forwardly and the gear segments 5 are engaged with the dial pinions, while upon swinging the shifting rock-arms downwardly, the rock-arms 8 are swung rearwardly and the gear segments are disengaged from the dial pinions.

14 represents a cam whereby the gear segments are engaged with the dial pinions. This cam is mounted on the upper portion of a vertically swinging rocking-frame 15, which is arranged on the right-hand side of the machine. This cam is provided at its front end with an incline or cam face 16, and at its rear end with a concentric face 17. When the cam is in its rearmost or retracted position, its incline stands in rear of a roller or projection 18 on the rear end of the shifting arm 13, as shown in Figures 2, 7, 9, and 16. Upon swinging the rocking frame 15, so that the cam 14 moves forwardly, the incline of the latter engages underneath the roller 18, and raises the arm 13, thereby moving the arms 8 forwardly. The throw of the incline 16 is just sufficient to engage the teeth of the gear segments with the dial pinions. When the roller 18 has been raised to the top of the incline, the concentric portion of the cam engages with the roller during the continued forward movement of the cam, and the latter does not shift the gear segments any further forward.

When the rear end of the concentric face 17 of the cam passes forwardly from underneath the roller 18, the constant pull of the springs 11 causes the rock-arm 13 to be depressed and the rock-arms 8 to be moved rearward, thereby disengaging the gear segments from the dial pinions. Upon now moving the cam 14 backwardly together with the rocking-frame 15, this cam does not affect the arm 13 and the parts connected therewith, but is affected by said arm at the last portion of the backward movement of the cam, at which time the back or lower side of incline 16 engages with the roller 18 which lifts said incline, and at the end of the backward movement of the cam, the latter clears said roller and drops behind the same, as shown in Figure 2, preparatory to again raising the roller 18 and connecting parts during the next forward movement of the cam 14.

For the purpose of permitting the front end of the cam to rise so as to clear the roller 18, this cam is pivoted at its rear end to the rear portion of the rocking-frame 15. The upward and downward movement of the front end of the cam is limited by means of a lug 19 projecting from the side of the cam and engaging with a slot in the adjacent part of the rocking-frame 15, as shown in Figures 16 and 29.

The rocking-frame 15 is secured with its lower portion to a transverse rock-shaft 20 journaled in the main frame and provided outside of the frame with a hand crank 21, as shown in Figure 16, whereby this shaft is rocked and the parts connected therewith are operated.

The gear segments 5 are raised to their highest position by means of a return or lifting-bar 22 which extends transversely underneath all of the arms 6 of the gear segments and which is connected loosely at its rear ends with the transverse rod 7 by lifting plates 23. 24 represents two shifting arms which are mounted loosely at their rear ends on the rock shaft 20 and which support at their other ends a transverse-bar 25 which transverse bar is connected at its ends, by two links 26, with the lifting plates 23, whereby upon raising the shifting arms 24, the lifting-bar 22 is caused to raise the gear segments and the other parts connected therewith resting on said bar. Upon depressing the transverse bar 25, the lifting bar 22 is moved downwardly and the gear segments resting thereon are permitted to move downwardly with the bar until the segments are arrested.

Each of the gear segments is yieldingly held in contact with the lifting bar 22 by a spring 27 which connects the arm of the segment with the transverse bar 25. If the downward movement of the gear segment is arrested while the shifting arms 24 continue to move downwardly, the lifting-bar 22 is moved away from the underside of the arm of the gear segment and the spring 27 is strained. The transverse bar 25 is arranged at one end in a segmental notch 28 formed in the front part of the rocking frame 15, shown in Figures 2, 7, 9, and 16, and its opposite end is arranged in a similar segmental notch 28, formed in a rocking frame 29 (Fig. 16) which is secured to the operating shaft 20 on the left-hand side of the machine. The rocking frames 15 and 29 together with the operating shaft 20 constitute the main or universal operating frame of the machine.

When the machine is at rest, as shown in Figure 2, the transverse bar 25 engages with the front side of the notches 28 in the rocking frames 15 and 29. Upon turning the rocking-shaft 20 forwardly by means of its handle 21 in the direction of the arrow, Figure 2, the rocking frames are moved forwardly during the first part of the movement independent of the transverse bar 25. The latter remains at rest until the inclined front end 16 of the cam 14 has raised the arm 13 and moved the gear segments into engagement with the dial pinions, during which movement the rocking frames move idly the extent of their notches 28 along the ends of the bar 25 without disturbing the latter. After the gear segments have been engaged with the dial pinions, the continued forward movement of the rocking frames causes the rear ends of their notches 28 to engage with the bar 25 and depress the same, thereby causing the lifting-bar 22 to be moved downwardly and strain the springs 27. This causes all of the gear segments which are free, to be moved downwardly and to continue their downward movement until they are arrested. During the downward movement of the gear segments, while they are in engagement with the dial pinions, the latter and the dials connected therewith are turned in the direction of the arrow, Figure 7, until the downward movement of the segments is arrested. The extent which each dial is turned depends upon the position in which the downward movement of the operating segment is arrested. After the segments have been arrested in their downward movement, they remain in this position while the rocking frames complete their forward movement. At the end of the forward movement of the rocking frames, the roller 18 of the rock arm 13 drops off from the rear end of the concentric part of the cam 14, thereby allowing the springs 11 to pull the gear segments rearwardly out of engagement from the dial pinions.

Upon now turning the rock-shaft 20 backwardly by means of the handle 21, the rocking frames are moved backwardly, until the front end of the notches engage with bar 25. When the latter is so engaged it is moved backwardly with the rocking frames to the end of their rearward movement which causes the transverse bar 25 to lift the lifting bar 22 and the gear segments which have been depressed, into their highest or normal position. During this upward movement of the depressed gear segments they are out of engagement with the dial pinions, whereby the dials are not turned backwardly with the segments, but remain in their shifted position.

30 represents a number of elbow-shaped controlling arms, which form part of the devices whereby the downward movement of the registering gear segments is controlled. One of these arms is arranged along the left-hand side of each gear segment and consists of an upright front part and a horizontal lower part which extends rearwardly from the lower end of the upright part, thereby leaving a clear space in rear of the upright part of the controlling lever, as represented in Figures 1, 2, 7, 9, 12 and 15. The rear end of the lower part of each controlling arm is mounted loosely on a transverse supporting bar 31, while the upper end of its front or upright part is loosely connected with the upper portion of its companion gear segment. This loose connection permits the controlling arm and the gear segment to swing freely about their individual axes, which are arranged parallel but out of line, and also permits the gear segment to move forward and backward into and out of engagement with its companion dial pinion. In the uppermost position of the controlling arms the same bear with their upper ends against a transverse stop-bar 32, as shown in Figure 2, which limits the upward movement of these arms. Each controlling arm is provided on the rear part of its upper end with a locking lug 33, and on the front part of its upper end with a stop-lug 34, both of which lugs project toward the left and are preferably stamped out in one piece with the controlling arm.

The operation of the registering devices is controlled by a number of elbow-shaped key levers which are arranged side by side and pivoted to a transverse supporting-rod 35. Each key lever is provided with a lower-actuating arm 36 which projects forwardly and an upper stop arm 37 which projects upwardly along the left-hand side of one of the controlling arms and gear segments, as represented in Figures 2, 7, and 12. Each of these key levers is provided on the rear side of its stop arm with a locking shoulder 38 which is adapted to engage with the locking lug 33 of the controlling arms when the latter is elevated into its highest position and the key-lever is in its fully retracted position, as shown in Figure 2. When the parts are in this position, the key lever holds the controlling arm against downward movement and the latter holds the gear segment against downward movement. If the gear segment while so held against downward movement is moved forward into engagement with the adjacent dial pinion, and the rocking frames are turned forwardly for depressing the gear segment, the spring 27 of this segment will be strained, without, however, shifting the segment. At the end of this forward movement of the rocking segments, the roller 18 of the rock arm 13 drops off from the rear end of the cam 14, the gear segment is moved rearwardly out of engagement from the dial pinion and then the rocking frames move backwardly without having shifted the dial.

The upper arm of each key lever is provided on its front side with a vertical series of differential stop shoulders 39, which are arranged step fashion and extend from the upper end of this arm downwardly and forwardly thereon, or in other words, the stop shoulders 39 are arranged radially out of line with one another, and different distances from the pivot of the key lever. These stop shoulders of the key lever are adapted to be moved forwardly into the path of the stop lug 34 on the controlling arm. The stop shoulders are arranged different distances from the stop lug 34 of the controlling arm, so that by moving different stop shoulders of the key lever into the path of the stop lug of the controller arm, the latter and the gear segment connected therewith may be arrested at different points in their downward movement. The uppermost stop shoulder of the key lever is most remote from the stop lug of the controlling arm and therefore requires the greatest forward movement of the key lever, in order to bring this stop shoulder into the path of this stop lug.

The stop shoulders of the key lever are so arranged that the distance from the stop shoulders to the path of the stop lug gradually grows less from the uppermost stop shoulder to the lowermost stop shoulder. The relative position of the different stop shoulders of the key lever is such that when its locking shoulder 38 remains in engagement with the locking lug 33 and the gear segment is simply moved into and out of engagement with its dial pinion, the latter remains at zero, if the same has not been previously moved. But when the key lever has been moved forwardly, so as to disengage its locking shoulder from the locking lug and moves one of its stop shoulders into the path of the stop lug of the controlling arm, the latter arm and gear segment connected therewith will be moved downwardly upon moving the rocking frames forwardly, until the stop lug of the controlling arm strikes the respective stop shoulder of the key lever which stands in its path, as represented in Figure 7, whereby the gear segment, while turning in engagement with the adjacent dial gear pinion, turns the same forward. By turning the key lever forward more or less, and moving one or the other of its stop shoulders into the path of the stop lug 34 of the controlling arm, the distance which this arm descends can be varied, thereby varying the number of spaces which its gear segment turns the adjacent dial.

Main number key mechanism.

40 represents the main keys whereby the key levers of the main registering and recording mechanism are operated, and which are guided with their depending stems in the top 41 and bottom 42 of the key-board. As shown in the drawings, nine longitudinal columns of these keys are arranged transversely side by side. The first column on the right-hand side of the machine contains seven keys and represents fractions of one-eighth of a cent, the next column toward the left contains nine keys and represents cents, and the remaining columns of keys toward the left each contains nine keys and represents progressively higher orders of numbers according to the decimal system, so that the registering keys in the last, or left-hand column represents hundreds of thousands of dollars.

The lowest numbers of the several columns of keys are arranged transversely in a row on the rear part of the key-board, and the corresponding higher numbers of the several columns are arranged likewise in transverse rows and progressively in their order toward the front end of the key-board.

Each of the registering keys is yieldingly held in an elevated position by a spring 43 surrounding the stem of the key and connected at its upper end to the key and bearing with its lower end against the bottom of the key-board. The upward movement of each key is limited by a shoulder 44 formed on the upper part of its stem and engaging with the underside of the top of the keyboard, as represented in Figures 11, 18, 20 and 24.

The downward movement of all of the keys is substantially the same, but the arrangement of each column of keys lengthwise of the lower actuating arm of each key lever causes the keys to bear against their lever at different distances from its pivot, so that by depressing different keys the same distance, the key lever will be turned different distances. The keys having the lowest numbers bear against their respective key levers nearest the pivot and consequently the levers are thereby thrown the greatest distance, and the uppermost stop shoulders are shifted into the path of the stop lug 34 of the respective controlling arms. The throw of each key lever upon depressing any one of its keys is so adjusted that the proper stop shoulder on its upper arm is moved into the path of the stop lug 34 of the controlling arm, and the downward movement of the respective gear segment is arrested after having turned the adjacent dial gear pinion a number of spaces corresponding to the number of the key which is depressed.

Loose connection for segments.

The loose connection between each controlling arm and its gear segment, heretofore referred to, is shown in its simplest form in the connection between the controlling arm and the gear segment, which are controlled by the initial or lowest column of registering keys. As shown in Figures 1 and 15, the loose connection between the controlling arm and the gear segment of the lowest registering device consists of upper and lower guide lugs 45 and 46 arranged on the upper end of the segment and bearing against the upper and lower guide faces 47 and 48, which are formed on the upper end of its companion controlling arm. As the controlling arm and segment rise and fall, the guide lugs of the segment slide back and forth on the guide faces of the arm. The guide faces are so constructed that the back and forth movement of the segment on the arm is radially with reference to the dial pinion in all positions of the segment. By so forming the guide faces of the arm, the gear segment can be engaged with and disengaged from the dial pinion in all positions of the segment without disturbing the position of the dial pinion. The construction of the loose connections between the controlling arms and gear segments of all of the higher registering devices above the fractional registering device are combined with carrying devices, whereby each registering dial, upon making one complete turn, causes the next higher dial to be turned forward one space, thereby carrying up a number from one column to the next higher column. The loose connections between the controlling arms and the segments and the carrying mechanism of the higher registering devices are constructed as follows:

As shown in Figures 1, 2, 7 and 12, each controlling arm is provided at its upper end with upper and lower guide faces 47 and 48 and its lower guide face is engaged by a lower guide lug 46 on the adjacent gear segment, the same as in the coupling between the controlling arm and segment of the initial registering device.

The gear segments of the higher registering devices are each provided with an upper guide lug 49 which is adapted at times to bear against the upper guide face 47 of the companion controlling arm in substantially the same manner in which the upper guide lug 45 of the fractional gear segment bears against its companion arm, the only difference being that the upper guide lugs 49 of the higher gear segments are held out of engagement and separated by a space from the upper guide face of the companion arm, when no number is carried from a lower to a higher registering device. The upper guide lug 49 is held in this elevated position above the adjacent guide face by a rocking latch 50 which is arranged in a notch in the rear side of the gear segment and which normally projects toward the left and engages with the upper guide face 47 of the adjacent controlling arm, as shown in Figures 2 and 12.

During the ordinary up and down movement of each higher controlling arm and gear segment, the latter is guided by its lower guide lug 46 and the locking latch 50 engaging with the lower and upper faces of the adjacent arm, this movement being the same as the movement of the controlling arm and gear segment of the fractional registering device. Normally the downward movement of the controlling arm is determined by the position of its companion key lever and this arm in turn controls the extent of the downward movement of the gear segment. When, however, the locking finger 50 is withdrawn out of engagement from the upper guide face 47 of the arm, the companion gear segment is capable of moving downward independently of the arm until the upper guide lug 49 engages with the upper guide face of the arm. The extent of this independent movement of the gear segment with reference to its companion arm is equal to one tooth or space of the segment, so that by this means the gear segment is enabled to turn the dial pinion one space more than the position of the key lever permits the same to move.

The withdrawal of the locking latch of each higher registering device is controlled by the next lower registering device and the withdrawal of each latch is effected when the next lower registering device has made one complete turn and arrives at zero. Each of the locking latches is pivoted on the right hand side of its adjacent gear segment, so as to turn transversely with reference to the latter. As better disclosed in the parent case, Patent No. 1,429,201 heretofore mentioned, the latch is turned toward the left into its operative position by a spring, the movement in this direction being limited by a suitable shoulder arranged on the latch and bearing against the right hand side of the gear segment. 53 (Figs. 1 and 12) is an upright trip plate connected with the lower end of each latch and arranged normally at right angles or nearly so to the adjacent gear segment, when the latch is in its operating position. 54 (Figs. 2, 7 and 9) represents a number of upright trip arms, each of which is controlled by a lower registering device and which turns the locking latch of the next higher registering device into an inoperative position. This arm is mounted loosely with its lower end on the supporting bar 35 and is provided at its upper end with a rearwardly and forwardly projecting hook 55, and in front and below said hook with a bend forming a bearing finger 56 (Figs. 2 and 7). 57 represents trip cams arranged on the left-hand side of each registering dial pinion and connected with the adjacent pinion and dial, but separated from the pinion by an intervening space or groove as more clearly shown in Fig. 31 of Patent No. 1,429,201, before mentioned. The face of each of these cams may begin at its lowermost point near the axis thereof and then extend outwardly in a spiral line terminating with its highest point in line with its lowermost point with which it connects abruptly. The trip cam of the fractional registering device has its face divided into eight parts, each part of which except the first is arranged one-eighth of a space further from the center of the cam than the preceding part, while the trip cams of the higher registering devices each has its face divided into ten parts, each part except the first being arranged one tenth of a space farther from the axis of the cam than the preceding part. Each of the trip arms 54 extends upwardly along the right hand side of the trip cam of a lower registering device, and its shoulder 56 engages with the face of this cam, while the hook 55 at its upper end extends toward the left and is adapted to engage with the trip plate 53 of the next higher registering mechanism. In the initial position of each trip arm, its shoulder 56 engages with the lowest part of its trip cam, as represented in Figures 2 and 9. As the trip cam is turned in the direction of the arrow, Figure 2, at the same time that its dial and gear pinion are moved forwardly by the adjacent gear segment during the adding operation the trip arm is moved backwardly by the gradually rising face of the trip cam. During the backward movement of the trip arm, its hook engages with the trip plate 53 of the next higher registering device and is deflected toward the right thereby, the hook being sufficiently elastic for this purpose. After the hook has passed in rear of said trip plate, the hook owing to its resilience springs back to its normal position, so as to stand behind said trip plate. When the shoulder of the trip arm reaches the highest part of the face on the trip cam the trip arm has been shifted to its rearmost position. Upon now turning this cam forwardly another space together with its companion dial and pinion, the highest part of the cam is carried from underneath the shoulder of the trip arm and the latter is moved forwardly over the abrupt face of the cam until its shoulder 56 again engages with the lowest part of the cam face. During this movement of the trip arm, its hook strikes the rear side of the trip plate 53 of the next higher registering mechanism and turns the same forwardly, thereby disengaging the locking latch from the adjacent controlling arm and permitting the gear segment carrying the trip plate to move forward one space. The forward movement of the trip arm is effected when the dial with which its trip cam is connected has made one complete rotation and again stands at zero, whereby the addition represented by this complete rotation is carried to the next higher registering device. The forward movement of the trip arm is effected quickly by a spring 58, (Figs. 2 and 7) which connects with a stationary cross bar 59 arranged in front of the trip arms. The trip plate 53 of each registering device is so arranged and is of such length that the hook of the next lower trip arm can engage with the rear side of the plate, for disengaging its latch in any position of the gear segment carrying the plate, and in order to accomplish this engagement it is obvious that cams 57 should be constructed so as to give arms 56 the proper throw.

If a gear segment is locked in its highest position by reason of none of its companion keys having been depressed, the withdrawal of its latch from the controlling arm simply permits the gear segment to drop one space and turn its companion dial pinion forward one space, while in engagement therewith, the movement of this dial representing one number carried up from the next lower dial. If any one of the keys of the key levers has been depressed, so as to release the gear segment and permit the same to move downwardly for effecting an addition, and if during this time the next lower registering device has made a complete turn, so as to require the carrying up of a number from the next lower registering mechanism, the latch of the higher registering device will be withdrawn while the same is effecting its addition, thereby causing the segment to descend and turn its dial one space in addition to the spaces corresponding to the depression of its respective key.

When the locking latch has been withdrawn so as to permit a gear segment to move downwardly one space farther than its controlling arm, the latch remains in this position during the subsequent upward movement of the arm and the segment until the upward movement of the arm is arrested by striking the stop bar 32 and the gear segment continues its upward movement independent of the arm the extent of one space. The gear segment has now reached its highest position and its latch is again swung automatically by its spring over the controlling arm. The controlling arm and gear segment now remain in this relative position until another number is to be carried up from the next lower registering device.

When the controlling arm has been retracted to its highest position, the adjacent key lever is moved into its normal retracted position, so that its locking shoulder 38 engages with the locking lug 33 of the controlling arm and locks the latter against downward movement. The return movement of each key lever is preferably effected by a spring 60 (Fig. 2) which connects the upper arm of the key lever with the transverse shaft 9, as shown in Figures 2 and 7 or with some other convenient part of the machine. The lower guide lug of the gear segment is not absolutely necessary because the weight of the parts connected with the controlling arm and arranged in rear of its pivot is sufficient to raise the arm, but it is preferable to employ this lower guide lug 46 on the gear segment because it compels the arm to raise with the gear segment and avoids displacement of these parts with reference to each other, and also serves as a stop to limit the upward movement of the gear segment.

The gear pinion and the co-operating gear segment of the fractional registering device are so constructed that the fractional dial makes one rotation whenever it is moved forward eight spaces. After the fractional dial has made one rotation the whole number represented by this rotation is transferred by the first carrying device from the registering mechanism of the fractional dials to the next higher registering device which represents cents.

The complete turns of each of the following registering devices are in like manner carried or transferred to the next higher dial by the respective carrying device. The dial which records the highest number, in this instance the millions of dollars, is preferably operated only by the adjacent carrying device of the next lower dial and is incapable of being operated directly from the key-board because it is not provided with a key operating mechanism.

The mechanism whereby the dials are all turned back to zero or the place of beginning after the addition of numbers has been completed is constructed as follows:

61 represents a series of feeling rock levers which are adapted to shift the key levers, so as to permit the gear segments to descend the proper distance for resetting or restoring the main registering dials to zero. One of these shifting levers is mounted loosely on the supporting bar 35 adjacent to the left hand side of each of the key levers and is provided on its upper arm with a forwardly projecting feeling finger 62 and with a shifting finger 63 which extends behind the upper arm of the adjacent key lever. The feeling levers have their fingers arranged in rear of the total cams 57, and each of these levers is turned so that its upper arm moves backwardly by the upper arm of the adjacent key lever engaging with the shifting finger 63 of the feeling lever. 64 represents a transverse pull bar arranged in rear of the lower arms of the feeling levers and connected with each of the latter by a pull spring 65, as represented in Figures 2, 7, and 16. This pull bar is connected at its ends to the lower ends of two depending pull or rock arms 66, which are secured at their upper ends to the rock shaft 9, as shown in Figure 16. Upon turning this rock shaft, so as to swing its depending pull arms backwardly, the feeling levers are turned by means of the springs 65 so as to move the upper arms of these levers forwardly. This movement of the rock shaft 9 is effected by a cam 67, which is mounted on the left-hand side of the rocking frame 29 and which is constructed substantially the same as the cam 14 which is mounted on the rocking frame 15. As shown in Figures 14 and 17, this cam is pivoted at its rear end by a transverse pin to the rear portion of the rocking frame 29 and is provided at its front end with an incline or cam face 68 and in rear of the incline with a concentric face 69.

The cam 67 is pivotally supported on the rocking frame 29 in the same manner in which the like cam 14 is pivoted on its corresponding rocking frame 15. The cam 67 can be raised and lowered with its front end into an inoperative or operative position, this movement being limited by means of a lug 70 arranged on the cam, as shown in Figure 16, and projecting into a slot 71 in the adjacent rocking frame in the same manner in which movement of the cam 14 is limited.

72 Figures 14 and 16, represents a rearwardly projecting rock-arm secured to the rock shaft 9 and provided at its rear end with a roller or projection 73 which is adapted to be engaged by the cam 67 for turning the rock-shaft 9. When numbers are being added with the machine, the cam 14 is depressed, as shown in full lines, Figure 2, so as to be in a position when moved forwardly by the rocking frame 15 to engage the roller on the arm 13, for moving the gear segments into engagement with the dial pinions, and during this time the cam 67 is lifted into the position shown in full lines, Figure 14, so that when the rocking frame 29 is moved forwardly, the cam 67 will clear the roller 73 of the rock arm 72 and not disturb the rock-shaft 9 and the parts connected therewith.

If it is desired to restore all of the total dials 2 to zero, the cam 14 is raised into its inoperative position, shown by dotted lines 14 in Figure 2, and the cam 67 is lowered into its operative position, as shown by dotted lines 67ª in Figure 14. Upon now turning the rock-shaft 20 by hand so as to move both rocking frames 15 and 29 forwardly, the cam 14 passes over the roller 18 of the arm 13 without disturbing the same, but the inclined front of the cam 67 engages with the roller 73 on the rear end of the rock-arm 72 and raises the same until this roller engages with the concentric part 69 of this cam. By this movement of the arm 72, the rock-shaft 9 is turned in the direction for moving its depending arms 66, rearwardly and pulling the springs 65 rearwardly. This pull on the springs 65 causes the feeling levers to be turned until the feeling fingers of their upper arms engage with the spiral surfaces of the trip cams. After the feeling fingers bear against these cams, their movement is arrested and the continued backward movement of the pull bar 64 simply stretches the springs 65 until the bar reaches the end of its backward movement. The feeling finger of each feeling lever engages with that part of the surface of the adjacent trip cam which is directly opposite the feeling finger, and as these trip cams are turned with the adjacent dial they present different parts of their spiral surfaces to the opposing feeling fingers, which causes the forward movement of the upper arms of the feeling levers to be arrested in different positions when swung forwardly. During the forward movement of the upper arm of each feeling lever, its shifting finger 63 engages with the rear side of the upwardly projecting arm of the adjacent key lever and moves this arm forwardly. The construction of the parts is such that the spiral surfaces of the trip cam bears a definite relation to the step-shaped series of stop shoulders on the upper arm of the key lever. When the feeling finger of the feeling lever, upon being moved forwardly, bears against the lowest key-lever-stop-controlling part of the adjacent trip cam, the adjacent key lever is carried simultaneously forward with the feeling lever the greatest distance and its uppermost stop shoulder is carried into the path of the stop lug of the controlling arm. The succeeding parts of the spiral surface of the trip cam are so constructed that they rise progressively higher and arrest the forward movement of the feeling lever when the same has carried the adjacent key lever with its corresponding stop shoulder into the path of the stop lug of the controlling arm. This forward movement of the feeling lever and that of the upper arm of the key lever is gradually reduced as the progressively higher parts of the trip cam are presented to the feeling finger, and when the highest part of the trip cam is presented to the feeling finger, the feeling lever is prevented from moving forward at all and the upper arm of the key lever is not moved with its locking shoulder out of engagement with the locking stop of the controlling arm and consequently the companion gear segment connected therewith is held against downward movement. After the rocking frames 15 and 29 have been turned forwardly sufficiently to engage the several feeling fingers of the feeling levers with their respective trip cams, the rear ends of the segmental notches 28 in the rocking frames engage with the cross bar 25 and depress the same, thereby moving the lifting bar 22 downwardly and at the same time pulling down the springs 27. This downward pull on these springs causes each spring to pull its respective gear segment down as far as possible, and after the downward movement of the segment has been arrested the continued downward movement of the cross bar 22, together with the rocking frames simply stretches these springs until this bar reaches the end of its downward movement. If a gear segment is locked in its uppermost or zero position its spring 27 will be stretched its fullest extent, whereas, if a gear segment moves downwardly more or less before it is arrested by its shifted key lever, its spring 27 will be stretched less in proportion. This downward movement of the gear segments which are free to move in this direction takes place while the gear segments are in their retracted position and out of engagement from the dial pinions, so that the dials are not effected by this movement of the segments.

After the rocking frames have reached the end of their forward movement and the roller 73 has dropped off from the rear end of the concentric portion 69 of the cam 67, the gear segments are moved forwardly by hand operated mechanism into engagement with their respective dial pinions and are held in this position during the entire subsequent backward movement of the rocking frames, which is effected by hand operated mechanism. During the backward movement of the rocking frames, the gear segments are raised to their highest positions, while in engagement with the dial pinions by the rod 22 and connecting parts and turn the dials backwardly. At the end of the upward movement of the gear segments the latter are released, so as to permit them to move into their retracted position, out of engagement from the dial pinions.

During this operation those gear segments which are held or locked in their highest positions, by reason of their dials being at zero, are simply moved forward at the end of the forward movement of the rocking frames, so as to engage with their respective dial pinions and are again moved backwardly out of engagement therefrom at the end of the forward movement of the rocking frames, without disturbing their respective dials. Each of the unlocked gear segments is moved downwardly a number of spaces corresponding to the number which is registered on its dial, the extent of this movement being controlled by the companion trip cam which arrests the forward movement of the key lever, through the medium of its feeling lever, when the proper stop shoulder of the key lever has been presented to the controlling arm.

Upon now moving the gear segments forwardly in their variously depressed positions and then raising them to their highest position, each depressed gear segment will turn its dial backward the same number of spaces that the gear segment was depressed. Inasmuch as each gear segment was permitted to descend by its trip cam, feeling lever and key lever the same number of spaces as the number indicated on its dial, the gear segment subsequently moves upwardly the same number of spaces before reaching its highest position, thereby turning its dial backwardly the same number of spaces and restoring the same to zero. When all of the dials have been turned to zero, the shoulders 56 of all the trip arms engage with the lowest parts of all of the trip cams 57.

The mechanism whereby the positions of the cams 14 and 67 are reversed preparatory to restoring the dials to zero is constructed as follows:

The cams 14 and 67 drop into their operative position by gravity. Each of these cams is provided in rear of its pivot with a tail 75 which is depressed when it is desired to lift the respective cam into its inoperative position.

76 is a shifting lever which is pivoted at its lower end and is normally turned so that its upper end is disengaged from the rear side of the tail on the cam 14 by a spring 77, as shown in Figures 2 and 7. The member 76 projects in rear of the main frame so as to be accessible for manual operation.

78 is a shifting lever which is pivoted between its upper and lower arms and arranged with its upper arm in rear of the tail on the cam 67 and normally held in engagement therewith by a spring 79, as shown in Figure 14. 80 represents an elbow lever pivoted below the bottom of the key-board, as represented in Figure 14. 81 represents a main line or cord which is connected with the lower arm of the elbow lever 80 and which is provided at its rear end with two branches 82 and 83. The branch 82 connects with the shifting lever 76 above its pivot, and the branch 83 connects with the shifting lever 78 below its pivot. 84 represents a total or shifting key having a depending stem which is guided in top and bottom of the key-board and which bears with its lower end against the upper arm of the elbow lever 80. Upon depressing the key 84, the elbow lever 80 is turned, so as to draw the cords or lines 81, 82 and 83 forwardly, thereby moving the upper end of the shifting lever 76 into engagement with the tail of the cam 14 and lifting the same into an inoperative position, while the shifting lever 78 is moved rearwardly with its upper arm from the tail of the cam 67, thereby allowing the latter to drop into its operative position. Upon depressing the gear segments while the parts are in this shifted position, the segments move downwardly out of engagement with the dial pinions. After the gear segments have been depressed they are moved forwardly into engagement with their respective dial pinions by an elbow lever 85 which is connected with its lower arm by a line or cord 86 to the rod or bar 7, as shown in Figure 14, or to one of the rock arms 8. The elbow lever is turned in the proper direction for this purpose by a shifting key 87 having a depending stem which is guided in the top and bottom of the keyboard and which bears against the upper arm of the elbow lever 85. After the gear segments have been moved forwardly into engagement with the dial pinions, while in the depressed position, the gear segments are retained in forward position, and at the same time raised until they reach their uppermost position, whereby the dials are turned to zero. The shifting key 87 is now released which permits the spring 11 to move the gear segments rearwardly out of engagement with the dial pinions. The key 84 is also released, thereby permitting the shifting levers 76 and 78 to resume the positions shown in Figures 2 and 14, leaving the machine in position to resume adding.

Each of the dials is held against turning while out of engagement with its companion gear rack by means of a detent pawl 103 which engages with the front side of its companion gear pinion, as shown in Figure 2. The pawls 103 of the several gear pinions are mounted on a transverse pawl bar 104, which is supported at its ends by means of two pawl arms 105, which turn loosely upon the supporting rod or bar 35 of the key levers. The pawl arms are moved rearwardly for engaging the pawls of the bar 104 with the gear pinions, by means of springs 106 (Fig. 14). These springs are connected loosely at their rear ends to the rockshaft 9 and at their front ends to the pawl arms 105. During the forward movement of the gear segments preparatory to turning the dial pinions, the detent pawls are swung forwardly out of engagement with the dial pinions by means of two shifting rods 107 which are connected at their rear ends to opposite ends of the transverse rod 7 or some part moving therewith and each of which is provided at its front end with a fork or bifurcation 108, which engages with a pin or shoulder 109 on the pawl arm arranged on the adjacent side of the machine. As the gear segments move forward into engagement with the gear pinions the shifting rods 107 move the detent pawls 103 out of engagement with the dial pinions, and when the gear segments move backwardly the detent pawls are again engaged with the dial pinions by the springs 106.

*Recording mechanism.*

For the purpose of recording the numbers which are added together by the above described mechanism a recording mechanism is provided which is constructed as follows:—

140 represents a printing roller or platen which is arranged transversely in the upper, rear part of the machine and under the lower side of which the sheet or other article is placed which receives the record. 141 represents a number of type segments which are arranged transversely side by side below the platen and which are pivoted at their front ends to the supporting bar 31 upon which the rear ends of the controlling arms 30 are pivoted. Each of these type segments is provided at its rear end with a segmental row of type carriers 142, which are capable of moving radially back and forth on the type segment.

Each of the type carriers is provided at its rear end with a type and is guided upon the type segment by means of screws or rivets 143 secured to the type carrier and arranged in radial slots 144 formed in the type segment, as shown in Figures 2 and 3. Each of the type carriers is held in its inward or retracted position by means of an S-shaped spring 145 (Fig. 25), which is arranged between the carrier and the type segment and is secured with one end to the carrier and with its other end to the type segment. Upon raising or lowering the type segment any one of its type can be brought to the printing point or line, and upon striking the back or inner end of the type carrier, when the same is in line with the printing point the type carrier will be driven outwardly and its type will produce an impression on the sheet supported by the platen. After the carrier has received the blow for driving the same against the platen, the carrier is again quickly retracted to its innermost position by means of its spring.

Each of the type segments is connected with one of the controlling arms, so that upon depressing a controlling arm and the registering gear segment connected therewith, the companion type segment will be raised and present one of its type to the printing point.

For convenience in operating the machine, the keys are separated a considerable distance on the key-board and in order to produce a compact record, the printing segments are arranged closer together than the keys and the registering mechanism. In order to permit of this arrangement, each type segment and its corresponding controlling arm are connected by connecting arm 146, as represented in Figures 1, 2 and 12. The connecting arms of the central controlling arms and type segments are comparatively straight, but the connecting arms of the outer type segments and controlling arms are arranged obliquely, the degree of this obliquity gradually increasing from the central type segments and controlling arms in opposite direction toward the outer type segments and controlling arms, as represented in Figure 1. The connecting arms 146 of the outer controlling arms are arranged in the spaces behind the upright parts and above the horizontal parts of the controlling arms, thereby permitting the inner controlling arms to move up and down without interfering with the connecting arms 146 of the outer controlling arms.

The types on each type segment are arranged to correspond with the teeth and numbers of its companion gear segment and registering dial, the zero type being at the upper end of the series and the progressively higher digits arranged in their order downwardly from the zero type. When the registering gear segment is in its highest position it presents its zero tooth to the dial pinion, and the segment which at this time is in its lowest position presents its zero type to the printing point. Upon depressing a gear segment so as to present one of its higher teeth to the pinion, its companion type segment is raised proportionally and presents a corresponding higher numbered type to the printing point.

147 represents a number of hammers whereby the type carriers are struck for driving the type against the platen. One of these hammers is arranged adjacent to each type segment and is provided with a head which is arranged in front of the series of types and in line with the printing point of the platen. Upon shifting the type segment so as to bring one or another of its type carriers to the printing line and then operating the hammer, the latter delivers a blow against the inner end of the particular carrier which is at the printing point and produces an impression of its type on the platen. The several hammers are pivoted on the transverse rod 12, arranged in rear of the segments; and each of the hammers is yieldingly held in its forward position by a spring 148 connected at its lower end to a cross bar 149 and at its upper end to a depending arm 150 on the hammer.

151 represents a vertically movable trip bar or rod which is arranged transversely below the hammers and whereby the latter are operated. This bar is supported at its ends upon the rear end of rock arms 152 which turn loosely with their front ends on the rod 31 supporting the type segments and controlling arms.

153 represents a number of hammer or trip pawls, whereby the hammers are retracted preparatory to delivering a blow against the type carriers which are at the printing point. One of these pawls is arranged adjacent to each hammer and pivoted loosely at its lower end to the trip bar 151, and its upper end is provided on its rear side with a downwardly facing hook or shoulder 154 and above said shoulder with a trip face 155, as shown in Figures 3 and 6. Each of the hammers is provided in front of its pivot adjacent to the upper end of the hammer pawl with a lower trip lug or shoulder 156 and an upper trip lug or shoulder 157. When the parts are at rest, the hammer pawl 153 is raised into its highest position and the hammer is in its normal position with its lower trip lug 156 below and in rear of the hook of the hammer pawl and with its upper shoulder 157 in rear of the trip face of the hammer pawl, as represented in Figures 2 and 3.

Upon shifting the hammer pawl rearwardly, while the parts are in this position, so that its hook overhangs the lower shoulder 156 of the hammer, and then pulling the hammer pawl downwardly, the hook of the hammer pawl engages with the lower shoulder of the hammer and turns the same so that its head is retracted from the type carrier at the printing line. As the hammer moves downwardly with the hammer pawl, the upper shoulder of the hammer comes into engagement with the trip face of the hammer pawl and during the continued downward movement of the hammer and its pawl, this upper shoulder gradually crowds the hammer pawl forwardly with reference to the hammer, by reason of the hammer and its pawl swinging on different centers. During the last portion of the downward movement of the trip bar 151 and the hammer pawl thereon, the pawl is crowded forwardly by the upper shoulder 157 of the hammer to such an extent that its hook is disengaged from the lower shoulder 156 of the hammer, thereby liberating the latter and permitting its spring 148 to throw the same quickly and deliver a blow against the type carrier at the printing line. The trip bar 151 now rises and carries the hammer pawl into its highest position, preparatory to again engaging the hammer for depressing the same.

158 (Figs. 3 and 4) represents a number of upright shifting arms whereby the hammer pawls are moved rearwardly, so that their hooks engage with the lower shoulders of the hammers. One of these arms is arranged adjacent to each hammer pawl, as shown in Figures 3, 4 and 6, and is pivoted at its lower end on the trip bar 151, and its upper end is provided with a roller or projection 159 which bears against a hammer cam 160 on the lower part of the adjacent type segment, as shown in Figures 3, 7 and 12. This hammer cam is provided at its upper end with a receding or low portion, an inclined portion arranged below the low portion and a concentric or high portion arranged below the inclined portion. Each shifting arm 158 is moved forwardly and its roller is yieldingly held in engagement with the adjacent hammer cam by a spring 161 connecting said arm with a cross bar 162 secured to the rock arms 152, as represented in Figures 7 and 8. The backward movement of each hammer pawl with reference to its companion shifting arm, is limited by means of a stop 163 secured to the upper portion of the hammer pawl and engaging with the front side of the shifting arm, as represented in Figures 3, 4, and 5.

Each hammer pawl is yieldingly held in its rearmost position, with reference to its shifting arm by means of a C-shaped spring 164 secured with its ends, respectively, to the hammer pawl and its shifting arm, as shown in Figures 2, 3 and 4. In the lowermost position of a type segment, the receding part of its cam is presented to the roller of the shifting arm 158, which permits the hammer pawl to be retracted into its foremost position, as represented in Figure 2. Upon depressing the trip bar 151 when the parts are in this position, the roller 159 is not engaged soon enough by the incline of the cam 160 to engage the hook of the hammer pawl with the lower shoulder of the hammer, before the hook has passed below this shoulder, but, instead, the trip face of the hammer pawl slides idly against the shoulder 156 without retracting the hammer, whereby no impression of the particular type at the printing line is produced. If the type segment is raised, so as to present one of its lower types to the printing point or line, the incline of its cam during the first part of the upward movement of the segment moves the shifting arm 158 rearwardly together with the hammer pawl, yieldingly connected therewith, so that the hook of the hammer pawl stands over the hook of the lower shoulder 156 of the hammer. Upon now depressing the pawl 153 the hammer will be retracted and released near the end of the downward movement of the pawl, and will be quickly swung up by the spring 148, thereby delivering a blow against the type at the printing point and producing an impression thereof. The incline 160 of the type segment cam is so constructed that it throws the hammer pawl backwardly into an operative position when the segment is raised one digit space, and during the continued upward movement of the segment, the hammer pawl is held in this operative position by the high concentric part of the segment cam. By thus constructing the type segment cam, its companion hammer pawl is not shifted when the segment is not raised and its zero type remains at the printing line, but the hammer pawl is shifted into an operative position for producing an impression, if the type segment is raised one or more digit spaces and present any one of its digits higher than zero to the printing line.

*Automatic printing of zero.*

165 represents a number of transfer or coupling fingers which enable the ciphers in a number to be printed automatically. One of these transfer fingers is secured to each of the shifting arms 158, as represented in Figures 3, 4 and 7, and extends laterally toward the right therefrom into engagement with the shifting arm of the next lower hammer pawl, as represented in Figure 17. If any one of the printing segments remains in its lowest position, so that its cipher remains at the printing line and the next higher printing segment has been raised for printing a higher number or digit, the transfer finger of the higher hammer-shifting arm 158 while being moved rearwardly by the cam of its companion printing segment, is caused to engage with the shifting arm 158 of the next lower hammer pawl and shift the latter backwardly, so that its hook is carried backwardly over the lower shoulder of the companion hammer. Upon now depressing the trip bar 151, the higher pawl 153 is coupled with its hammer, and the next lower hammer pawl is also coupled with its hammer, whereby an impression of the cipher or zero type on the lower segment is produced on the platen at the same time that the next higher number is printed on the platen.

If two ciphers occur in succession in the body of a number, the shifting arm to the left of the highest order printing segment to be operated for printing a zero sets the hammer mechanism of said highest zero-printing segment by means of the transfer finger of said shifting arm, and the shifting arm of said highest zero-printing segment in turn by means of its transfer finger sets the hammer mechanism of the printing segment of next lower order, etc. The operation of producing an impression of the cipher type is effected automatically and renders it possible to print any number of ciphers in succession in the body of a number because the hammer operating mechanism of each segment which remain standing with its upper type at the printing line is controlled by the hammer operating mechanism of a higher type segment and in turn controls the hammer operating mechanism of the next lower type segment, if the next lower segment presents a cipher to the printing line. Only the ciphers below the highest digit in the number to be recorded are thus printed automatically because the printing of a digit depends upon the upward movement of a printing segment; thereby avoiding the printing of ciphers ahead of the highest digit in the number to be recorded. The hammer shifting device of the segment which prints the numbers representing units of cents is, preferably, not provided with a transfer finger to operate on the hammer shifting device of the segment which prints fractions of a cent, because it is proper that the space to the right of the lowest integer shall remain blank when no fraction is recorded therein.

The carrying bar 151 is raised by one or more springs 166 which connect this bar with the transverse rod 12, as shown in Figure 8, and the upward movement of the bar 151 is arrested, when the hammer operating pawls reach their highest position, by a transverse bar 167 which is engaged by the rear ends of the rock arms 152. 168 represents a coupling hook, whereby the hammer trip devices are depressed. This hook is pivoted with its upper end to the trip bar 151 and its lower engaging end is provided with a notch having upper and lower shoulders.

In the lowered position of this hook its notch engages with a cross bar 169 which is connected with the rock arms 24, as represented in Figures 2 and 7, so that the hook and the hammer operating devices connecting therewith are actuated from the rocking frames 15 and 29, through the medium of the rock arms 24. In the rearmost position of the rocking frames, the front ends of their notches 28 bear against the front side of the bar 25 to which the gear segments are yieldingly connected, and the cross bar 169 bears against the rear or upper shoulder of the notch of the hook 168, as represented in Figure 2. Upon swinging the rock frames forward, the incline of the cam 14 first raises the rock arm 13 and shifts the gear segments into engagement with the dial pinions, and after the segments have been so shifted, the rear shoulders of the notches 28, in the rocking frames, engage with the cross bar 25, so that thereafter this bar is carried downwardly with the rocking frames and the gear segments are depressed. During this downward movement of the bar 25 with the rocking frames, the companion bar 169 moves down idly in the notch of the hook 168 until this bar engages with the lower or front shoulder of this hook. After the cross bar engages with the lower shoulder of the notch of the hook, the latter and the hammer operating devices connected therewith are moved downwardly with the rocking frames until these frames reach the end of their downward movement. During the last portion of the downward movement of the rocking frames the hammer pawls are disengaged, as before described, from the retracted hammers, whereby the latter are released and strike the type carriers which are at the printing line. By this means, the blow of the hammers is delivered after the registering of the numbers has been effected on the dials and the type segments have been shifted into their proper position for recording the respective number.

The hammers do not follow the type carriers to the end of their outward movement, but are stopped short, after delivering a blow against the inner ends of the carriers, by their depending arms 150 engaging with a rubber facing 170 on the cross bar 167, as shown in Figs. 3 and 8, so that the types are moved outwardly by the impact of the hammers and are then returned by their springs so as to clear the printing surface.

When it is desired to print or record the total at the foot of the column of numbers which have been printed, the operation is as follows:—The total key 84 is first depressed, thereby raising the cam 14 into an inoperative position and lowering the cam 67 into an operative position. Upon now moving the rocking frames 15 and 29 forwardly, the feeling levers 61 are turned so as to move their feeling fingers forwardly into engagement with the respective cams 57 and at the same time each feeling lever carries the adjacent key lever forwardly so that its particular stop shoulder 39, corresponding to the position of the trip cam 57 and its dial is moved into the path of the stop lug 34 of the controlling arm. After the key levers have been thus shifted forwardly into their respective positions corresponding with their dials, the continued forward movement of the rocking frames causes the gear segments while in a retracted position out of engagement with the dial pinions to be depressed until each segment is arrested by the engagement of the stop lug on its controlling arm with the respective stop shoulder of its key lever, whereby each printing segment is raised so as to present the type carrier to the printing point which carries the type corresponding to the number registered on its companion dial. During the last part of the forward and downward rocking movement of the frames the hammers are operated and the particular types at the printing line are impressed on the platen. Upon now swinging the rocking frames backward, the gear segments are raised while still in a retracted position out of engagement with their companion dial pinions, thereby permitting further numbers to be added to the total already registered on the dials. If however, it is desired to turn the dials back to zero, after the total of the added numbers has been printed or recorded the gear segments, while in the retracted lower position which they occupy while printing the totals, are moved forwardly into engagement with their respective dial pinions by the depression of the key 87. Upon now moving the rocking frames backwardly the gear segments are raised while in their forward position in engagement with their pinions, whereby each of the latter is turned backwardly and when the segments reach the end of their upward movement, the dials have been turned backwardly a number of spaces corresponding to the number on the dial, thereby turning all of the dials to zero.

*Vertical ruling.*

Mechanism is provided whereby vertical ruling may be produced on the recording surface, this mechanism being constructed as follows:—

203 represents an upright ruling lever which turns loosely on the supporting bar 12 and which is arranged between the dollars and dimes printing segments, as shown in Figures 1, 10, 16 and 17. The upper arm of the ruling lever is provided with a vertical ruling blade 204 which is arranged close to the platen when in its upper position. The ruling lever is yieldingly held in this position by means of a spring 205 connected with the lower arm of the ruling lever and the movement of the latter toward the platen is limited by the engagement of its lower arm with the rear side of a rubber buffer 206 on the cross bar 167 similar to the rubber 170. 207 represents a pawl whereby the ruling lever is retracted and then released for permitting the same to deliver a blow against the recording surface, for producing a vertical ruling impression thereon. This pawl is pivoted at its lower end on the cross bar 151 and is yieldingly held with the hook 208, on its upper arm in engagement with a shoulder 209 on the ruling lever by means of a spring 210 which connects the lower arm of the ruling lever with the rod 162.

In the uppermost position of the bar 151 the ruling pawl engages the shoulder of the ruling lever, and upon depressing this bar, the ruling lever is pulled downwardly by the ruling pawl. During this downward movement of the ruling lever and pawl, the front side of this lever engages with the upper arm of the pawl and gradually crowds the pawl forward until the pawl is disengaged from the shoulder of the lever. When the ruling lever is thus released from the pawl, the lever is quickly turned by the spring 205 in a direction for throwing its upper arm upwardly, whereby its blade delivers a blow against the recording sheet or surface on the platen and produces a ruling impression thereon. During the last portion of the subsequent upward movement of the ruling pawl 207 its hook again engages over the shoulder of the ruling lever. This construction of vertical ruling devices produces the vertical ruling in sections by successive blows of the ruling blade.

*Word printing mechanism.*

For the purpose of permitting words to be printed in front of the numbers which are added together the following mechanism is provided:—

1411 represents a word-printing segment which is mounted loosely on the rod 31 next to the highest number printing segment of the main number recording mechanism, as represented in Figures 1, 8, 16 and 17. This segment is provided with a number of radially movable carriers 1420, which are constructed the same as the carriers of the number printing segments and each of which is provided on its face with a word-type. The words of these types are selected according to the purpose of business for which the machine is to be used. For instance, if the machine is to be used in a bank, types representing the words "Vouchers," "Checks," "Drafts," "Bills," and similar words common to the banking business may be used. When the machine is designed for use in a restaurant the words "Soup," "Vegetables," "Meats," "Dessert," and other words peculiar to this business may be used.

The position of the word-type segment is controlled by a key lever 3600, Fig. 8, which turns on the bar 35, is similar to the number key levers and is provided on the front side of its upper arm 3700 with a vertical series of differential stops or shoulders 3900 which are adapted to be engaged by the stop lug 3400 of a controlling arm 3000; and lever 3600 is also provided with a locking stop or shoulder which is adapted to be engaged by a locking lug 3300 on the controlling arm, as represented in Figure 8. The controlling arm 3000 is connected with the word printing segment by a connecting bar 1460. The stop shoulders on the upper arm of the word key lever are so arranged that upon swinging this lever so as to carry different shoulders into the path of the stop lug on the controlling arm, the latter will be arrested at different points in its downward or forward movement and the word printing segment connected therewith will be stopped at different points in its upward movement and present the particular word type to the printing point which corresponds with the shoulder or stop on the word key lever. The upward movement of the controlling arm 3000 is limited by its rear locking lug 3300 engaging with the stop bar 32 which arrests the upward movement of the controlling arms 30 of the number registering and recording mechanism. The downward movement of the controlling arm 3000 and the simultaneous upward movement of the word printing segment is effected by a spring 215 which yieldingly connects this arm with the bar 25 to which the registering gear segments are connected.

216 Fig. 1, represents a row of word keys having depending stems which are guided in the top and bottom of the key-board and which engage against the upper side of the front arm 3600 of the word key lever at different distances from the fulcrum thereof Upon depressing any of the word keys the word key lever will be turned the proper distance to bring its proper stop shoulder into the path of the stop lug of the companion controlling arm and arrest the word type segment, during its upward movement, when the word type corresponding with the word of the depressed key has reached the printing line. When the respective type is in this position the same is driven against the recording surface for producing an impression thereon, at the same time that the printing of the numbers by the numbering printing segments is effected. The word types are driven against the platen by a hammer operating mechanism which is constructed the same as the hammer operating devices of the number printing mechanism and the same letters of reference are therefore used to denote the same. The word key lever is yieldingly held in its normal position by a spring 600.

*Auxiliary adding mechanism.*

An auxiliary adding mechanism is provided which permits of effecting an addition of numbers different from the numbers which are added by the main adding mechanism.

This auxiliary adding mechanism is constructed as follows:—

2000 represents a number of auxiliary dials which are mounted on the left hand end of the dial shaft 3. 500 represents a number of auxiliary gear segments which are mounted on the transverse rod 7 and are adapted to engage with gear pinions 400 on the auxiliary dials, as represented in Figure 9. Each gear segment 500 is connected with a controlling arm 3001 arranged adjacent to the gear segment by a latch or coupling which at times permits the segment to move independently of the controlling arm. 3601 and 3701 represent auxiliary key levers which are operated by auxiliary keys 401 and which control the operation of the auxiliary registering and recording mechanism. The detail construction of the dials, gear segments, printing segments, key levers and the parts co-operating therewith of the auxiliary registering and recording mechanism, is substantially the same as the construction of the same parts in the main registering and recording mechanism, except as hereinafter distinguished, and the same letters of reference are therefore employed to denote like parts in both of these sets of mechanisms.

In the drawings, two auxiliary key levers and three auxiliary dials are shown, which permit of registering and recording a total of 999, but additional registering and recording devices may be employed if it is desired to increase the capacity of the machine.

In the auxiliary mechanism each of the higher gear segments 500 is provided with a pivot latch 501 (Figure 1) the same as in the main registering mechanism. The lowest or primary gear segment of the auxiliary registering mechanism is provided with a movable latch 502 (Figure 9) which is adapted to be engaged with or to be disengaged from the upper guide face of its companion controlling arm; but for the purpose of the present application this latch 502 may be dispensed with and the units mechanism of the auxiliary adding and recording mechanism may be constructed the same as the lowest order mechanism of the main adding and recording mechanism.

In the auxiliary registering mechanism, the gear segments are not provided with lower stops 46 like those of the gear segments of the main registering mechanism, which permits the auxiliary controlling arms to move downwardly when necessary independently of the auxiliary gear segments. The upward movement of the auxiliary gear segments is limited by stops 218 with which the upper ends of the gear segments engage. 219 represents a foot formed on the lower side of each controlling arm 3001 and adapted to engage with the lifting bar 22. However, these changes in construction from that of the main adding and recording mechanism, are for the purpose of permitting counting and numbering, and inasmuch as mechanism for this purpose forms no part of the invention claimed in the present application, the auxiliary adding and recording mechanism may be constructed similarly to the main adding recording mechanism in all points, and still attain all of the purposes of the present application.

For the purpose of effecting an ordinary addition of numbers on the auxiliary registering mechanism, the auxiliary key levers are shifted into the proper position by the depression of the keys 401 representing the numbers to be added and then the rocking segments 15 and 29 are turned forwardly. During the forward movement of the rocking frames the auxiliary gear segments are first moved into engagement with the auxiliary dial pinions by the cam 14 and then pulled down by the springs 27, and the controlling arms are also pulled down by the latches of the gear segments engaging with the controlling arms. The downward movement of the gear segments and controlling arms continues until the stops 34 of the controlling arms strike the shoulders 39 on the key levers which stand in the path of the stops 34. At the end of the forward movement of the rocking frames the gear segments are withdrawn from the dial pinions by the springs 60 and during the subsequent backward movement of the rocking frames, the gear segments and controlling arms are raised by the cross bar 22 engaging with the gear segments and with the feet 219 of the arms. The carrying of numbers from the units dial to the tens dial and from the latter to the hundreds dial and the turning of the dials to zero is effected in the same manner as in the main registering mechanism.

By this organization of the machine, numbers such as sales or prices of goods can be added and recorded by the main registering mechanism, and other numbers such as the rebate on sales or discount on the prices of the goods, can be separately added and recorded by the auxiliary registering mechanism.

The key controlled devices whereby the parts of the main registering and recording mechanism are shifted into the proper position preparatory to registering and recording a number are distinct from the key controlled devices whereby the same effect is produced in the auxiliary registering and recording mechanism, but both sets of registering and recording mechanisms are operated simultaneously by the one universal shifting mechanism for effecting the registration and recording of numbers which are represented by the different positions of both key controlled devices.

A paper carriage is provided for carrying the platen, and paper-feeding mechanism is provided for feeding the record sheet between the printing of items; but these mechanisms may be of any suitable and desirable construction, and the specific structure of these mechanisms forms no part of the invention claimed herein, and has therefore not been described in full. This mechanism is described in full and claimed per se in another divisional application Serial No. 242,395, filed June 28, 1918.

Any suitable inking means may be employed, and the mechanism shown for this purpose is not fully described in this application, as this specific structure is not an essential part of the invention claimed herein. This specific inking mechanism is fully described in Patent No. 1,429,201, granted September 12, 1922, and is fully described and claimed in another divisional application Serial No. 254,065, filed September 14, 1918.

Any suitable full stroke mechanism may be employed to prevent the operator from making only a partial forward and backward stroke of the rocking frames 15 and 29, and the mechanism shown for this purpose is not fully described in this application. This specific structure is not an essential part of the invention claimed herein, and is fully described, and claimed in various combinations in the patent above mentioned, and in the divisional applications Serial Nos. 183,397 and 183,398, to which reference is hereby made.

*Indicator or detector dials.*

In order to enable the operator to see which particular character or characters the machine is set for printing after depressing the keys, and thereby detect any errors in the depression of the keys, each of the key levers is provided with an auxiliary dial indicator or detector 238 which is turned forward the same number of spaces that the key lever has been depressed and then returns to its initial position when the key lever moves backward into its normal position. In the preferred construction of the detector dials shown in Figures 1, 2 and 7, each of these dials consists preferably of a wheel 238 provided on one side with a pinion 239 which is engaged by a gear segment 240 secured to the adjacent key lever, as shown in Figures 2 and 7.

Upon depressing one of the number registering and recording keys, the detector dial thereof is turned forwardly by the connecting gearing the same number of spaces corresponding with the number of the key which has been depressed. If a key lever is not depressed its detector dial remains at zero. The detector dial of the word printing mechanism is in like manner turned by its key lever so as to indicate the word which corresponds to the word of the depressed key.

The detector dials of the several registering and recording devices are mounted loosely on a transverse supporting rod 241.

*Keyboard mechanism.*

The keys which have been depressed in the operation of adding or recording a number, word or other character are automatically locked in a depressed position until the adding or recording operation of the particular number, word or other character has been completed, and then the depressed keys are automatically released and permitted to be raised by their springs.

As shown in Figures 2, 7, 9, 11, 14, 18, 19, 20, 21 and 24, the keys are held in a depressed position by a number of locking plates 327, one of which is arranged lengthwise on the left side of the stems of each row of keys. Each of the locking plates is pivoted at its lower end to the top of the keyboard bottom, so as to swing transversely and is provided along its upper edge with a number of downwardly facing catches or shoulders 328 which are adapted to engage with upwardly facing locking shoulders 329 on the stems of the keys. Each of the keys is provided with a convex face below its locking shoulder, consisting of a lower rising portion 330 which inclines upwardly and laterally from the lower part of the key toward the adjacent locking plate, and an upper receding portion 331 which inclines from the upper end of the rising portion to the outer end of the locking shoulder 329 of the stem, as shown in Figures 19 and 20. Each locking plate is drawn yieldingly with its catches against the stems of the adjacent row of keys by a spring 332, as shown in Figures 20 and 24. The locking catches of the locking plates bear against the key stems below the convex faces thereof when the keys are in an elevated position, as shown in Figure 18.

Upon depressing a key, the convex face on its stem deflects the locking plate and when the key has been depressed fully the respective locking catch of the locking plate engages with the locking shoulder 329 of the stem of the depressed key, thereby retaining the parts which are operated by said key in a shifting position.

If a wrong key has been depressed and the operator subsequently depresses the right key the latter during the first part of its downward movement engages the lower or rising part 330 of its convex face with the adjacent locking catch of the locking plate and disengages the respective locking catch from the locking shoulder of the previously depressed key, thereby releasing the same, as represented in Figure 11. Upon continuing the depression of the second or correct key after the first or wrong key has been released, the receding or upper part 331 of the convex face of the correct key engages with the adjacent locking catch of the locking plate, thereby permitting the latter to approach the key stem when the correct key has been fully depressed its locking shoulder is carried below the locking catch of the plate and is engaged thereby, whereby the correct key is locked in a depressed position, as represented in Figure 21. By this means any incorrectly depressed key is automatically released by the depression of the correct key and the latter is in turn automatically locked in a depressed position.

*Automatic key release.*

333 represents a transversely movable releasing bar, whereby the keys of the main number registering devices are released. This bar is arranged transversely in rear of the rear ends of the locking plates of the main number keys and is guided with its ends in the frame of the machine, as shown in Figures 18 and 22. This bar is provided with a number of upwardly projecting lugs or shoulder 334, one of which is adapted to engage with the right side of a pin or projection 335 on the rear end of each locking plate of the main registering keys, as represented in Figures 7 and 18. Upon shifting the releasing bar 333 toward the left its releasing lugs move the main locking plates in the same direction, thereby releasing any number keys which are held in a depressed position by the same. The main releasing bar 333 when free is shifted toward the right into its retracted position by the resilience of the springs which hold the main locking plates in their operative position.

The releasing bar 333 is shifted into its operative position by a releasing elbow lever 336 which turns on a pivot pin 337 and is connected by its upwardly projecting arm with the releasing bar 333 while its lower arm projects horizontally outward. 338 represents a releasing arm which is arranged lengthwise in the machine and transversely over the lower arm of the releasing elbow lever 336 and which is pivoted at its front end on a pin 339, as represented in Figures 14, 18 and 19. 340 represents a longitudinal releasing lever connected by an upright cord 341 with the rear end of the releasing arm 338 and projecting with its rear end into the path of the cross bar 25, as represented in Figure 14.

The main number keys are held in their depressed position until the rocking frames 15 and 29 have been moved forwardly sufficiently to operate the registering and recording mechanisms in accordance with the numbers of the depress main keys and then the cross bar 25, during the last part of its forward movement with the rocking frames 15 and 29 engages wth the releasing lever 340 and depresses the same. The releasing arm 338, during its downward movement with the releasing lever 340, engages with the lower arm of the elbow lever 336 and turns the latter so that its upper arm moves the main releasing bar 333 toward the left and moves the main locking plates out of engagement with the main number keys, thereby releasing the depressed main keys and permitting them to rise preparatory to setting the machine for registering and recording the next number.

The row of word keys 216 is arranged on the left-hand side of the main keys and the keys 401 of the auxiliary adding mechanism are arranged on the left hand side of the word keys. Each row of word and auxiliary number keys is provided with a locking mechanism similar to those of the rows of main keys.

The several shifting keys are arranged in a longitudinal row or column on the left of the auxiliary keys, and the elbow levers operated thereby are arranged one behind the other, as represented in Figures 14, 18 and 19.

342 represents an auxiliary releasing bar whereby the locking plates of the auxiliary keys are released. This bar is arranged transversely of the machine in front of, and parallel with the main releasing bar 333 and is adjustably connected therewith, so that the auxiliary releasing bar can be moved into an operative or inoperative position on the main releasing bar.

As shown in Figure 18, the auxiliary releasing bar is pivoted at its inner end to the main key-releasing bar by a horizontal pivot, and its outer end projects through an opening 343 in the frame, as shown in Figure 22, which permits this bar to be manipulated by the operator from the outside of the frame. The auxiliary releasing bar is held in its raised or lowered position by means of two notches or recesses 344, 345, formed one above the other in this bar and each of which is adapted to be engaged with a pin or projection 346 on the main releasing bar, as shown in Figures 18 and 22, by the resilience of the auxiliary releasing bar which is sufficiently elastic for this purpose.

Upon raising the auxiliary releasing bar and engaging its lower recess with the pin 346, the releasing lugs 347 of this bar are carried in front of the right side of the pins on the rear ends of the locking plates of the auxiliary keys, so that upon moving the main releasing bar toward the left for releasing the main keys, the auxiliary releasing bar is simultaneously moved in the same direction and disengages the locking plates from the keys. When it is desired to register or record an arithmetical progression of a number the auxiliary releasing bar is depressed, so that its lugs 347 are below the pins of the locking plates of the auxiliary keys, this bar being held in this position by engaging its upper recess 344 with the pin 346. Upon now depressing the auxiliary keys of the desired number and then operating the registering and recording mechanism the number represented by the depressed keys will be registered and recorded, but these keys will not be released. While the depressed keys are thus held in a depressed position, the registering and recording mechanism can be repeatedly operated, during each of which operations the number represented by the depressed key is added over and over again, thereby registering and recording the arithmetical progression of this number.

The two columns or rows of word and shifting keys are each provided with a locking mechanism similar to the main and auxiliary keys, but the locking plates of these keys are disengaged from the stems by a separate releasing mechanism so as to print the main and auxiliary number keys to be released without releasing the word and shifting keys.

As shown in Figures 18 and 19, the release of the word and shifting keys is effected by a supplemental releasing bar 348 having lugs 349 which engage with the pins 335 on the rear end of the locking plates of the word and shifting keys and guided at its outer end in the frame. The inner end of the supplemental releasing bar is pivoted to the upper arm of a releasing elbow lever 350. This lever is pivoted on the pin 337 and its lower arm projects toward the right and underneath the releasing arm 338 adjacent to the rear side of the lower arm of the releasing elbow lever 336.

When both lower arms of the releasing elbow levers 336 and 350 are arranged underneath the releasing arm 338, the depression of the latter by the rocking frames causes the supplemental releasing bar to be moved toward the left so that its lugs disengage the locking plates of the word and shifting keys from their respective stems at the same time that the main and auxiliary releasing bars disengage the locking plates of the main and auxiliary number keys from their respective stems, thereby releasing all the keys simultaneously after registering and recording of the words and numbers has been effected.

Repeat key.

For the purpose of permitting all the words and numbers represented by the depressed keys to be added and recorded repeatedly, the releasing elbow levers 336, 350 are shifted toward the right and their lower arms are moved from underneath the releasing arm 338 so that the depression of the lever 340 by the rocking frames will not affect the releasing elbow levers 336, 350 thereby retaining the keys in their shifted position and permitting of producing repeated additions and impressions of the types which correspond to the depressed keys. The releasing elbow levers 336, 350 are moved into operative or inoperative position by means of a supporting elbow lever 351, as shown in Figures 14, 18 and 19. This lever is pivoted on a stationary bracket 352 and its upper arm carries the pin 337 on which the releasing elbow levers 336, 350 are pivoted. 353 represents an actuating rock lever which engages with its rear arm against the underside of the lower arm of the supporting elbow lever 351.

354 represents a repeating shifting key having a depending stem which is guided in the top and bottom of the key-board and which engages with its lower end against the front arm of the actuating rock lever 353. Upon depressing the repeating key, the supporting elbow lever 351 is turned by the actuating lever in the direction for moving the releasing elbow levers 336, 350, so that their lower arms clear the releasing arm 338 and will not be affected by the depression of the latter.

Upon releasing the repeating key the supporting elbow lever 353 is returned to its normal position by a spring 355, shown in Figures 14 and 18, and the releasing elbow levers 336, 350 are shifted into an operative position with their lower arms projecting underneath the releasing arm 338. The releasing elbow lever 350 is turned in the direction for moving the supplemental releasing bar 348 into its retracted position by a spring 356 which is secured to the supporting elbow lever 351. The movement of the elbow lever 350 in this direction is limited by a stop 357 on the supporting elbow lever 351, as shown in Figures 18 and 19.

When it is desired to record the total of the added numbers or when it is desired to return the dials to zero, the number keys must all be released in order to permit the key levers to assume a position corresponding to the dials preparatory to recording the totals registered by the same. This is effected by an intermediate elbow lever 358 which is pivoted on the pin 339 and which projects rearwardly over the lower arm of the releasing elbow lever 336 but does not project over the lower arm of the releasing lever 350 as shown in Figures 18 and 19. 359 represents a longitudinal connecting bar connected at its rear end to the lower arm of the intermediate elbow lever 358 and provided with longitudinal slots 360 which receive pins or projections 361 on the lower arms of the elbow levers of the total and zero keys, as represented in Figure 14. The pins 361 of the total and zero elbow levers engage normally with the front ends of their respective slots in the connecting bar 359 which causes the latter to be shifted forward by any one of the respective keys without disturbing the others. Upon moving the connecting bar 359 forwardly by the depression of any one of the total or zero keys, the intermediate elbow lever 358 is turned in the direction for depressing its upper arm into engagement with the lower arm of the releasing elbow lever 336, thereby releasing all of the number keys. The depressed word keys and the shifting keys remain depressed until the rocking frames 15 and 29 have completed their forward movement and the registering and recording of the totals have been effected. The locking mechanism of the shifting keys is so constructed that the zero key 87 cannot be held down by the adjacent locking plate, as shown in Figure 14, because the depression of the same is necessary only during the backward movement of the rocking frames.

Key interlocking mechanism.

In order to produce a correct register and record of the numbers and words, each column of number and word keys is provided with a locking mechanism which prevents more than one key in each of these columns from being held in a depressed position at the same time. This locking mechanism is best shown in Figures 11, 13, 18, 20 and 23, and is constructed as follows:

365 represents a number of tumblers or blocks arranged in longitudinal rows on the bottom of the key-board each row being adjacent to the right side of the stems of a respective row of number or word keys. These tumblers are capable of a longitudinal movement with reference to the column of keys and each set of tumblers is guided on a rod 366 which is supported on the key-board bottom. Each of the tumblers is provided with a convex upper side which preferably slopes or inclines from its highest central part toward the front and rear sides of the tumbler in the form of an inverted letter V. The longitudinal movement of the tumblers is limited by the front and rear stops 367, 368 which are engaged by the front and rear tumblers and which also serve to support the guide rod 366 on the bottom 42, as shown in Figure 23. The stem of each number and word key is provided on the side opposite to its locking plate 327 with a follower or spreading head 369. The heads of the intermediate keys have a convex underside which preferably inclines from its lowest central part to the front and rear side of the head in the form of the letter V.

Each of the spreading heads except the foremost and rearmost is arranged over the space between two tumblers. The heads of the foremost and rearmost keys are arranged in front and in rear of the foremost and rearmost tumblers and these heads are inclined only on the side facing the adjacent tumbler, as shown in Figure 23. Upon depressing a key in any one of the columns of number or word keys, the spreading head of this key engages with the tumblers on opposite sides thereof and crowds the tumblers in front of the head forwardly and those in rear of the head rearwardly. When the shifting head has been depressed to its fullest extent, the foremost tumbler bears against the front stop 367 and the rearmost tumbler bears against the rear stop 368 and the slack between the several tumblers is fully taken up.

In Figure 23, the key number 5 is shown depressed fully and the slack between the tumblers is taken up, in which position of the key its shoulder 329 is engaged by the catch of the adjacent locking plate and is prevented from rising. If key number 5 was depressed erroneously and the correct key, for instance number 3 is subsequently depressed, this correct key moves downwardly idly until it engages or nearly engages the adjacent tumbler and when the correct key reaches this position its releasing cam or convex face engages with the adjacent locking plate and shifts the same out of engagement from the locking shoulder 329 of the depressed key number 5, as shown in Figure 11, thereby releasing this key and permitting the same to rise. During the continued downward movement of the correct key number 3 the spreading head of the same moves downwardly between the adjacent tumblers and shifts the same so as to take up the slack between them. When the correct key reaches the end of its downward movement, the same is locked in this position by the adjacent locking plate in the same manner in which key number 5 was previously locked.

The slack between the several tumblers is only sufficient to permit of the full depression of one key at a time and the tumblers are so constructed that when two keys are depressed simultaneously these keys are arrested in their downward movement before their locking shoulders are engaged by the locking plate. By this means any one key in a column may be depressed and locked in its depressed position and if an incorrect key has been depressed, the same is released by the subsequent depression of the correct key and the correct key is in turn locked in a depressed position but the locking of two keys at the same time in a depressed position is prevented.

It is some times desirable to depress several of the shifting keys simultaneously and lock the same in a depressed position. In the machine as organized no more than three shifting keys require to be depressed and locked at the same time. In order to prevent more than three shifting keys from being locked in a depressed position at the same time, the following mechanism is provided:—

370 represents a number of tumblers which are arranged in a longitudinal row below the stems of the shifting keys and each of which is secured to the lower end of a flat spring 371 depending from the underside of a supporting bar 372. Each of these tumblers has the form of an upwardly tapering wedge, as shown in Figure 24, and is capable of swinging lengthwise of the column of the shifting keys but is held against transverse movement by arranging the depending springs so that their flat sides extend transversely. 373, 374 represent front and rear stops arranged in front and in rear of the foremost and rearmost tumblers 370. 375 represents a number of followers or springs 376 to the lower end of the stem of each shifting key. Each of these heads is preferably cylindrical in form and is capable of swinging lengthwise of the column of shifting keys, but is held against lateral movement owing to the transverse arrangement of the flat supporting spring. Upon depressing any one of the shifting keys its head moves downwardly between the adjacent tumblers and shifts the same forwardly and backwardly from opposite sides of the spreading head. The front and rear stops 373, 374 are so arranged that the slack between the several tumblers is sufficient to allow of full depression of three shifting keys.

As shown in Figure 24 three keys are depressed fully and their followers or spreading heads have been moved between the adjacent tumblers so that the several tumblers bear against each other and against the depressed followers or head against the front and rear stops 373, 374, thereby taking up all of the slack between the tumblers. In order to lock these three keys in a depressed position the same must be depressed simultaneously. If an additional key is depressed, as shown in Figure 24, this fourth key is free to move downwardly without disturbing the previously depressed keys until its follower or head engages or nearly engages with the adjacent tumblers and when this fourth key reaches this position its releasing cam engages with the adjacent locking plate 327 and deflects the same, thereby disengaging the plate from all of the previously depressed keys and causing the same to rise simultaneously. It will thus be seen that by this means three keys can be locked in a depressed position and if an error has been made in the depression of one or more of the keys the subsequent depression of the correct key or group of three keys permits the release of the previously depressed incorrect keys and the locking of the correct keys in a depressed position. If it is desired to permit of locking more or less than three shifting keys in a depressed position, the slack space between the several tumblers must be adjusted accordingly.

Keys of different aspect.

In order to enable the operator to distinguish the figures or numbers readily on the key-board and thereby enable the same to be manipulated more rapidly the columns of main figure or number keys are arranged in groups and each group is distinguished by color or otherwise from the adjacent groups.

As shown in Figure 1, the keys of the first three columns representing figures to the right of the decimal point or less than a whole number are indicated in black on a white background; the second three columns of figures from the left of the decimal point to the first pointing off place representing the whole numbers less than thousands are indicated in white on a black background, and the third three columns of figures from the first pointing off place representing the whole numbers between hundreds and millions are indicated in black on a white background. The words and characters on the word keys and shifting keys are also indicated in white on a black background to distinguish them readily from the intermediate auxiliary number keys which are indicated in black on a white background. The dials and the indicators are colored similarly to the keys, whereby they are readily associated with their correlated keys.

I claim:

1. In a device of the class described; the combination of a plurality of totalizers; a printing mechanism; a plurality of sets of manipulative controlling devices for concomitantly controlling said printing mechanism and totalizers including plural sets of manipulative number inserting means, manipulative total printing controls, and manipulative arbitrary character printing controls; and means for visually detecting each control separately, including identifying indicia, and for demarking a plurality of sets of said controls into predetermined groups.

2. In a device of the class described; the combination of a plurality of totalizers; printing mechanism; a plurality of sets of manipulative controlling devices for concomitantly controlling said printing mechanism and totalizers, including plural sets of manipulative number inserting means, manipulative total printing controls, and manipulative arbitrary character printing controls; means for visually detecting each control separately including suitable identifying indicia; means for visually indicating the positions to be assumed by said printing mechanism when under the control of said total printing controls; and means for demarking a plurality of said sets of controls and printing position indicating means into predetermined groups.

3. In a device of the class described; the combination of a plurality of accumulator wheels; a printing mechanism; indicating elements; a plurality of groups of manipulative controlling devices for said accumulator wheels and printing mechanism, including manipulative item inserting means and manipulative total printing controls for causing the recording of the amount registered on said accumulator wheels, said total printing controls causing said indicating elements to indicate the amount registered on said accumulator wheels; and means for correspondingly visually demarking said manipulative controlling devices said indicating elements and said accumulator wheels in predetermined groups.

4. In an accounting machine, the combination with a plurality of totalizers, of actuating mechanism therefor, sets of indicators for exhibiting amounts added on the totalizers, means for causing the totalizers to control the indicators so as to indicate the totals added in the totalizers, and means for visually demarking the elements of said totalizers and indicators into corresponding predetermined groups.

5. In a device of the class described, the combination of a plurality of accumulator dials marked with identifying indicia, the construction and arrangement being such as to accumulate items, a plurality of sets of indicators marked with corresponding indicia arranged to indicate the items entered in said accumulators and to optionally exhibit the totals standing thereon, and means for visually demarking said indicators and accumulator dials in corresponding predetermined groups.

6. In a device of the class described, the combination of a plurality of accumulators; a plurality of indicators arranged in distinguishable groups and adapted to indicate the items accumulated on said accumulator dials and to optionally exhibit the totals standing thereon; a plurality of groups of manipulative devices including means for controlling the exhibition of indications on said indicators and for controlling the type of computation to be executed by said accumulators; and means for visually demarking said groups of manipulative devices, said demarcation of the groups of manipulative devices for controlling the exhibition on said indicators corresponding to the distinguishable grouping of the indicators.

7. In a device of the class described, the combination of a plurality of sets of totalizer wheels; means for accumulating items on said sets of totalizer wheels including groups of manipulative controlling devices a plurality of sets of indicator dials corresponding to the sets of totalizer wheels arranged in groups corresponding to said controlling device and adapted to indicate the items entered into said totalizer wheels and optionally operative to indicate the amounts visible on the totalizer wheels and means for visually demarking each of the groups of manipulative controlling devices and coordinately demarking said groups of indicator dials.

8. In a device of the class described, the combination of a plurality of sets of totalizer wheels provided with indicating dials; means for accumulating items on each of said sets of totalizer wheels and for taking totals therefrom; a plurality of sets of indicators corresponding to the sets of totalizer wheels arranged to indicate the items entered in and to optionally exhibit the totals taken from said totalizer wheels; a plurality of sets of manipulative controlling devices for said sets of totalizer wheels and indicators; and means for correspondingly visually demarking the sets of said manipulative controlling devices said accumulator wheels and said indicators.

9. In a key mechanism, a plurality of rows of optionally settable controlling numeral keys marked with identifying indicia, each of said rows adapted to mechanically represent by a stop positioning means all the digits 1 to 9 inclusive of a denominational order at the option of the operator, said rows being arranged in successive progressive denominational orders, said rows of keys being arranged so as to represent monetary quantities including distinctive colored markings to segregate fractions of one dollar into one color group, dollars, tens of dollars and hundreds of dollars into a second and differently distinctively colored group, and a third group distinctively colored like the first group.

10. In a device of the class described, the combination of a plurality of accumulator dials marked with position determining identifying indicia; a plurality of indicator dials marked with similar and corresponding indicia, arranged so as to indicate the items entered on the accumulator dials; a plurality of groups of manipulative controlling devices arranged to control corresponding groups of said accumulator dials and of said indicator dials; and means for visually distinguishing all elements of all the above mentioned groups, so that each of said groups will present an appearance such that the represented value will be recognizable substantially instantaneously.

11. In a calculating machine, the combination with a plurality of sets of accumulators; of a plurality of sets of depressible manipulative controlling devices therefor, a set of said controlling devices being allocated to a respective one of said sets of accumulators for determining the extent of actuation of its respective accumulators, the said sets of manipulative devices and sets of accumulators being so colored that corresponding sets of each are noticeably different from the others, the resultant demarcation between said manipulative devices and accumulators serving to facilitate control of the said accumulators by said manipulative devices.

12. In a calculating machine, the combination of a plurality of accumulators; of a plurality of groups of rows of manipulative depressible controlling elements therefor for controlling the entry of items into said accumulators by mechanically representing said items, each row of said elements being correlated with an accumulator for differentially controlling the extent of angular movement of said accumulator, and the elements of a plurality of adjacent groups of rows of controlling elements and the correlated accumulators being colored so as to render certain groups noticeably different from contiguous groups.

13. In a calculating machine, the combination with a plurality of accumulator dials; of a plurality of depressible manipulative devices for controlling the entry of items on said accumulator dials by mechanically representing said items, each of said devices being correlated with an accumulator dial of said plurality of dials for determining the extent of actuation of said accumulator dial, the said devices and dials being so colored that said devices are readily associated with their respective dials and that one of said devices and its respective dial are noticeably different from another of said devices and its respective dial, the resultant demarcation between said devices and between their corresponding dials serving to facilitate control of said accumulator dials by visually indicating the usual denomational classification of said inserted items.

14. In a key mechanism, a plurality of groups of rows of controlling numeral keys, the rows of keys being arranged in denominational order, each of said rows of keys constituting a mechanical representation of the digits from 1 to 9 inclusive and the keys of each row being of a different denominational order from the keys of the adjacent rows, the keys of one of said groups of rows of keys being noticeably differently colored from the keys of the adjacent groups of rows of keys; and a row of keys other than numeral keys and arranged on one side of said plurality of groups of rows of numeral keys and colored so as to be noticeably different from the adjacent row of said plurality of groups of rows of numeral keys.

15. In a printing mechanism, the combination of a plurality of type carriers arranged in groups; a plurality of types mounted on each of said carriers, and a plurality of groups of rows of character-bearing controlling keys one row for each type carrier of the plurality of said type carriers, each key of a plurality of keys of each of said rows being correlated with its type carrier for positioning a respective one of said types the keys of one of said groups of rows of keys being characterized, irrespective of the designatory characters thereon so as to be noticeably different from the keys of the adjacent groups of rows of keys, and means for correspondingly demarking the groups of type carriers whereby the control of said type carriers by said keys is facilitated.

16. In a printing mechanism, the combination of a plurality of type carriers arranged in groups, a plurality of types mounted on each of said carriers, and a plurality of rows of depressible controlling keys, one row for each carrier of a plurality of said type carriers each key of a plurality of keys of each of said rows being correlated with its type carrier for positioning a respective and corresponding one of said types, a plurality of said rows of keys being arranged in groups of rows corresponding to said groups of type carriers, the bodies of the keys of one of said groups of rows of keys being contrastingly colored from the bodies of the keys of the adjacent groups of rows of keys, and means forming a corresponding demarcation between said groups of type carriers.

17. In a printing mechanism, the combination of a plurality of type carriers, a plurality of types mounted on each of said carriers, and a plurality of rows of depressible controlling keys one row for each carrier of a plurality of said type carriers, each key of a plurality of said keys of each said row being correlated with its type carrier for positioning a respective one of said types, the keys of one of said rows of keys being differently colored from the keys of only an adjacent one of said rows of keys, and means to effect a line of demarcation between said type carriers at a position corresponding to the line between adjacent different colored rows of keys, whereby the control of said type carriers by said keys is facilitated.

18. In a key mechanism, a plurality of rows of depressible controlling numeral keys, each of said rows of keys representing the digits from 1 to 9 and the keys of each row being of a different denominational order from that of the keys in the adjacent rows, said plurality of rows of keys being arranged in groups of rows of keys, the keys of one of said groups of rows of keys being colored so as to be noticeably different from the keys of the adjacent groups of rows of keys.

19. In a key mechanism, the combination of a plurality of rows of item representing keys, one row each for units, tens, hundreds and thousands, the keys of the units, tens and hundreds rows being similarly colored, and the keys of the thousands row being colored so as to be noticeably different from the keys of the other said rows of keys whereby the mechanical representation of an item is facilitated by the characteristic visual selection of the said keys through a substantially instantaneously recognizable denominational classification.

20. A keyboard comprising a plurality of groups of rows of optionally settable item keys, each of said keys being provided with designatory indicia; the rows of each group being arranged in successive denominational orders and a characteristic of the keys of one of said groups of rows of keys being noticeably different, irrespective of the said designatory indicia thereon, from a characteristic of the keys of the next adjacent groups of rows of keys, whereby the setting up of an item is facilitated by a visual selection of said keys through a substantially instantaneously recognizable denominational classification.

21. The combination in a keyboard, of grouped parallel columns of number keys arranged progressively in the order of numbers on opposite sides of the decimal point, the columns of keys on the right side of the decimal point indicating fractions of a whole number bearing one color, the first group of three columns of keys on the left of the decimal point which indicate units, tens and hundreds being markedly distinguishable by color from the keys indicating the fractional numbers, the second group of three columns of keys toward the left of the first group of whole numbers representing thousands, tens of thousands and hundreds of thousands being markedly distinguishable by a color different from the keys in the first group of whole numbers, and so on in the same manner throughout any higher orders of numbers, substantially as set forth.

22. In a machine for printing numerical digits adapted to be a measure of quantity wherein the digits are spaced or separated into groups for the purpose of visual classification, types for effecting printing, said types being grouped in a manner to produce a corresponding classification in the printed numerical items, means for summing the printed items and means for indicating the sum of such items by means of indicators separated into groups distinguishable by contrasting colors in such manner as to correspond to the said classification.

23. In a machine of the class described, means for printing numerical items which may represent money values wherein the cents are divided from the dollars by a distinctive mark, depressible manipulative controlling means for determining the various digits to be printed, said controlling means being separated into groups which are distinguishable by different colors in such manner as to correspond to the division effected by the printing mechanism.

24. In a machine of the class described the combination of a plurality of number keys arranged in rows said rows being arranged in groups according to the denominational orders of the system of units for which the machine is adapted, a plurality of visible totalizer dials one for each row of said keys, means whereby said totalizer dials may be operated to accumulate numbers under the control of said keys, said keys of one group and the corresponding dials being distinguishably colored from the keys of an adjacent group and their corresponding dials, whereby the denominational order of a particular row of keys and its correlated dial may be readily ascertained.

25. A keyboard comprising a plurality of denominational columns of keys arranged in groups of columns on opposite sides of the decimal point, the first group of these columns of keys on the left of the said decimal point being noticeably distinguishable in color from all of the keys of the adjacent group of rows of keys to the right of the decimal point.

26. In an accounting machine, the combination with a totalizer, contrasted groups of means for controlling said totalizer, indicators arranged in corresponding contrasted groups, and means for controlling said indicators at times by said totalizer and at other times by said groups of means.

27. In an accounting machine, the combination with a totalizer, of distinguishable groups of indicators, corresponding distinguishable groups of means for controlling said indicators and controlling the extent of movement of said totalizer, of resetting means for said totalizer and means for causing said indicators to indicate during a resetting operation the extent of movement of said totalizer.

28. In an accounting machine, the combination with a totalizer, of controlling mechanism including distinguishable groups of amount keys for the same, correspondingly grouped indicators for exhibiting amounts added to the totalizer and means for causing the indicators to indicate the total amount added to the totalizer.

29. In an accounting machine, the combination with a totalizer for accumulating amounts on opposite sides of the decimal point, indicators for indicating amounts on opposite sides of the decimal point, a keyboard comprising groups of controlling means arranged on opposite sides of the decimal point for facilitating the control of said totalizer and said indicators, means for controlling said indicators by said controlling means or by said totalizer, and visual means for locating the decimal point in said totalizer, said indicators and said keyboard.

30. In a calculating machine, the combination with a totalizer, of controlling means for said totalizer and arranged in contrasted groups, indicators arranged in corresponding contrasted groups, means whereby said indicators may be controlled by said controlling means, and means whereby said totalizer may be controlled by said controlling means, the arrangement of said controlling means in contrasted groups and of said indicators in corresponding contrasted groups serving to facilitate the identification of the denominational orders of an amount to be entered in the machine.

WILLIAM S. GUBELMANN.